(12) United States Patent
Sommer et al.

(10) Patent No.: US 8,166,032 B2
(45) Date of Patent: Apr. 24, 2012

(54) SYSTEM AND METHOD FOR SENTIMENT-BASED TEXT CLASSIFICATION AND RELEVANCY RANKING

(75) Inventors: Matthew S. Sommer, Plano, TX (US); Lawrence N. Goldstein, Dallas, TX (US)

(73) Assignee: MarketChorus, Inc., Dallas, TX (US)

( * ) Notice: Subject to any disclaimer, the term of this patent is extended or adjusted under 35 U.S.C. 154(b) by 417 days.

(21) Appl. No.: 12/384,880

(22) Filed: Apr. 9, 2009

(65) Prior Publication Data
US 2010/0262454 A1    Oct. 14, 2010

(51) Int. Cl.
*G06F 17/30* (2006.01)
(52) U.S. Cl. .................................. 707/736; 707/758
(58) Field of Classification Search .................. 707/736, 707/758
See application file for complete search history.

(56) References Cited

U.S. PATENT DOCUMENTS

| | | | |
|---|---|---|---|
| 4,839,853 A | 6/1989 | Deerwester et al. | |
| 5,675,819 A | 10/1997 | Schuetze | |
| 6,615,208 B1 | 9/2003 | Behrens et al. | |
| 6,847,966 B1 * | 1/2005 | Sommer et al. | 707/739 |
| 7,269,598 B2 | 9/2007 | Marchisio | |
| 7,483,892 B1 | 1/2009 | Sommer et al. | |
| 2006/0242040 A1 | 10/2006 | Rader | |
| 2008/0215571 A1 * | 9/2008 | Huang et al. | 707/5 |
| 2009/0216524 A1 * | 8/2009 | Skubacz et al. | 704/9 |
| 2010/0121857 A1 * | 5/2010 | Elmore et al. | 707/748 |

OTHER PUBLICATIONS

Mitchell, M. and Mulherin, H. "The Impact of Public Information on the Stock Market," The Journal of Finance, vol. 49, No. 3, Papers and Proceedings Fifty-Fourth Annual Meeting of the American Finance Association, Boston, Massachusetts, Jan. 3-5, 1994. (Jul. 1994), pp. 923-950. http://links.jstor.org/sici?sici=0022-1082%28199407%2949%3A3%3C923%3ATIOPIO%3E2.0. CO%3B2-F (last accessed Apr. 8, 2009).

Pang, B. and Lee, L., "Opinion Mining and Sentiment Analysis," Foundations and Trends in Information Retrieval 2(1-2), (2008), pp. 1-135. http://www.cs.cornell.edu/home/llee/omsa/omsa-published.pdf (last accessed Apr. 8, 2009).

Pang, B., Lee, L. and Vaithyanathan, S., "Thumbs up? Sentiment Classification using Machine Learning Techniques," Proceedings of the Conference on Empirical Methods in Natural Language Processing (EMNLP), pp. 79-86, 2002. http://www.cs.cornell.edu/home/llee/papers/sentiment.pdf (last accessed Apr. 8, 2009).

(Continued)

*Primary Examiner* — Son T Hoang
(74) *Attorney, Agent, or Firm* — Rudolph J. Buchel, Jr.

(57) ABSTRACT

The sentimental significance of a group of historical documents related to a topic is assessed with respect to change in an extrinsic metric for the topic. A unique sentiment binding label is included to the content of actions documents that are determined to have sentimental significance and the group of documents is inserted into a historical document sentiment vector space for the topic. Action areas in the vector space are defined from the locations of action documents and singular sentiment vector may be created that describes the cumulative action area. Newly published documents are sentiment-scored by semantically comparing them to documents in the space and/or to the singular sentiment vector. The sentiment scores for the newly published documents are supplemented by human sentiment assessment of the documents and a sentiment time decay factor is applied to the supplemented sentiment score of each newly published documents. User queries are received and a set of sentiment-ranked documents is returned with the highest age-adjusted sentiment scores.

33 Claims, 19 Drawing Sheets

OTHER PUBLICATIONS

Cui, H., Mittal, V. and Datar, M., "Comparative Experiments on Sentiment Classification for Online Product Reviews," Proceedings of the Twenty-First National Conference on Artificial Intelligence (AAAI-06), Jul. 16-20, 2006, Boston, Massachusetts. http://www.cuihang.com/publications/grvw.pdf (last accessed Apr. 8, 2009).

Turney, Peter D. and Littman, Michael L., "Unsupervised Learning of Semantic Orientation from a Hundred-Billion-Word Corpus," (2002) [Departmental Technical Report] (Unpublished) http://arxiv.org/abs/cs.LG/0212012 (last accessed Apr. 8, 2009).

Das, S. R., and Chen, M. Yahoo! for Amazon: Sentiment extraction from small talk on the web. Working Paper, Santa Clara University. Available at http://scumis.scu.edu/~srdas/chat.pdf, 2006. (last accessed Apr. 8, 2009).

* cited by examiner

FIG. 2 — CREATING A HISTORICAL SENTIMENT DOCUMENT VECTOR SPACE FOR A TOPIC BY USING CHANGES IN AN EXTRINSIC METRIC FOR MEASURING SENTIMENT

FIG. 6 — Constructing a historical document sentiment vector space from movements in an extrinsic metric

TAG USAGE

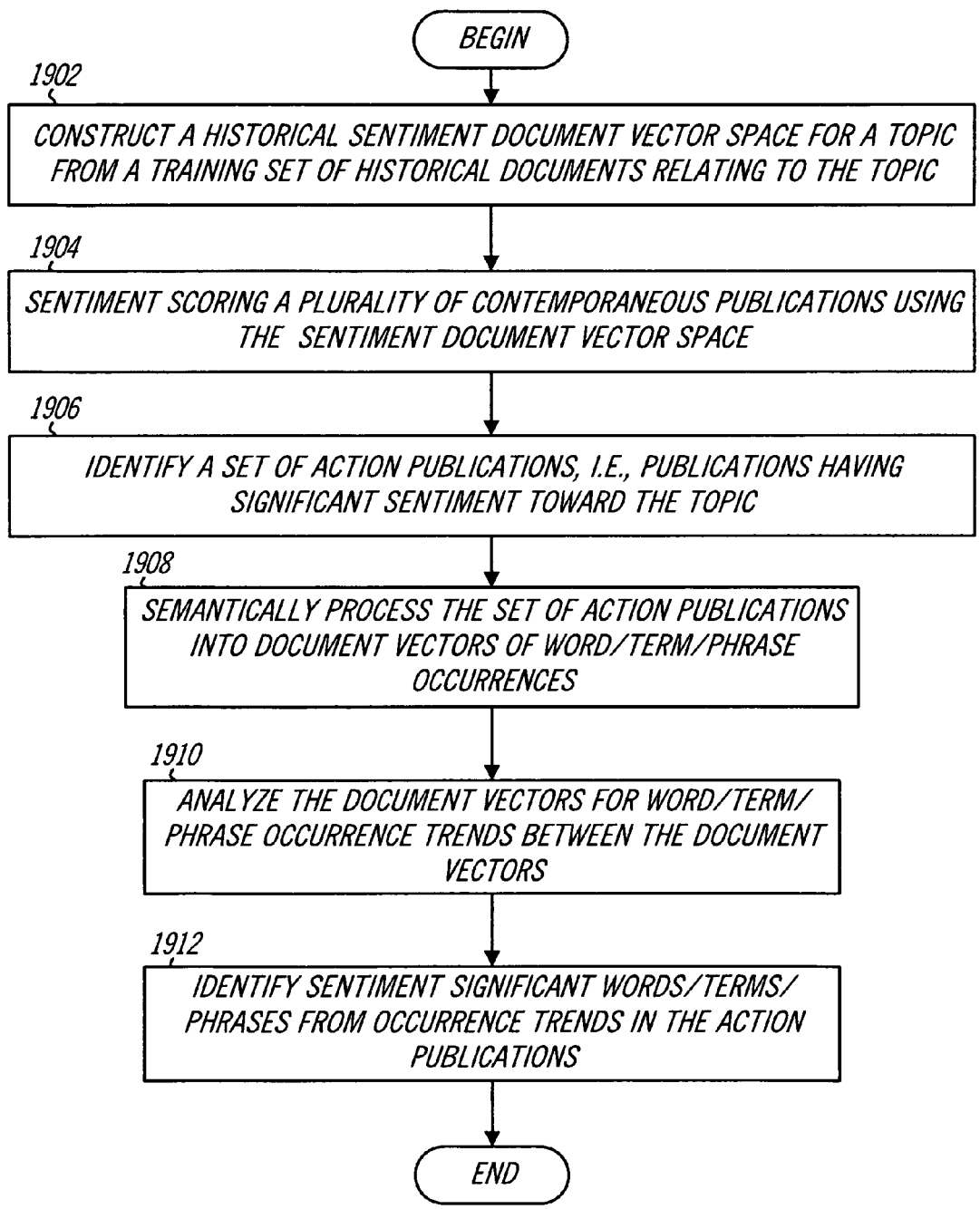

SYSTEM AND METHOD FOR SENTIMENT-BASED TEXT CLASSIFICATION AND RELEVANCY RANKING

BACKGROUND OF THE INVENTION

The present invention relates generally to a text classification, ranking, and forecasting based on sentimentality. More particularly, the present invention relates to a system, method and software program product for the sentiment ranking of documents based on movement in a related activity.

In today's business climate, the availability of timely information is essential to a successful operation. This information comes in many forms, such as daily, weekly, monthly and even quarterly publications that are available from a multitude of different authors and publishers, but can usually be acquired from an online media source. With this overabundance of seemingly relevant news, many businesspeople find themselves inundated with a plethora of information to examine on a daily basis. Because of these time constraints, only a small percentage of all news that is available can be examined comprehensively. The difficulty is in selecting only the most relevant articles and excluding less relevant news.

Most businesspeople select only the articles relevant to the subject matter that are important to them at the time. However, subject matter filters, such as keyword searches and the like, rarely ever reduce the amount of information to a manageable amount. Therefore, the relevant news articles are often further filtered by familiarity to the user, that is, by authors, publishers and media sources that the businessperson are familiar with. This mythology often results in a tunnel vision to all news articles except those having some familiarity to the businessperson. Occasionally, an article from an unfamiliar source may be selected for examination that is suggested by a friend or respected colleague, but by in large, time constraints limit a businessperson to familiar publications.

In some businesses, such as equity trading, the number of news articles returned from familiar sources may be quite extensive, perhaps ten to fifty articles per day. Considering that most traders track tens to hundreds of unique equities, indices and instruments, the actual number of news articles to be examined each day may be in the hundreds or even thousands. In addition, since each of the news articles returned by the keyword/familiarity filtering may be considered as equally important to every other article returned, it is difficult for a user to select only the most important articles to the exclusion of lesser important articles.

The combination of familiarity and keyword filtering narrowly limit the scope of document to be returned based on the businessperson's proficiency with document filters and experience with a particular topic. However, even if the businessperson is reasonably proficient with document searches and well experienced, the volume of news articles returned for review can be overwhelming. What is needed is another method of document filtering to return only a sample of the most relevant documents, regardless of the businessperson's familiarity with the publication.

BRIEF SUMMARY OF THE INVENTION

The present invention is related to assessing the sentimentality of a document, set of documents, words, terms or phrases toward a particular topic. More particularly, the present invention is directed to ranking document sentimentality based on an extrinsic measure of sentiment to a topic. Still more particularly, the present invention is directed to a system, method and software program product for sorting a plurality of documents relative to each document's degree of sentimentality polarity towards a particular topic based on an extrinsic measure of sentiment to the topic. A relevancy ranking algorithm is provided herein that classifies documents according to their measured sentiment towards a topic. Each set of documents is further correlated to a set of human entered or measured events that may further influence its ranking. Documents with measurable semantic or tonal features can be ranked and sorted for similarity to the correlated documents.

Essentially, the presently presented invention comprises constructing a document sentiment vector space for a topic. The sentiment of a set of training documents towards the topic is assessed and standardized sentiment binding-phrases that describe the polarity of the sentiment are included in the respective documents. The documents are then semantically processed into document sentiment vector space for the topic. The standardized sentiment binding-phrases provide the sentiment vectors for defining one or more sentiment dimensions in the sentiment space.

The document sentiment vector space can be queried for documents having a high degree of sentiment polarity toward the topic. These documents can then be used as a sentiment standard for finding semantically similar publications that may be considered to have a sentiment polarity toward the topic proportional to their similarity.

The sentiment polarity of any publication with respect to the topic can be accessed by semantically processing the publication into the document sentiment vector space. The publication's location in the document sentiment vector space is a measure of its sentiment polarity toward the topic.

The sentimentality of the set of training documents towards the topic can be determined by analyzing intrinsic or extrinsic factors relating to the training set. Sentiment models may be created for analyzing the occurrence of words, terms and phrases intrinsic to the training documents. Alternatively, the sentimentality of the documents can be determined by monitoring changes in an extrinsic metric related to the topic. Movement in the value of the extrinsic metric simultaneously with the publication infers sentiment polarity toward the topic; positive movement in the value may be further assumed as a result of positive polarity toward the topic; and negative movement in the value is construed as negative sentiment positive. The sentiment polarity of documents from the training set is bound to each document using the standardized sentiment binding-phrases that describe the respective polarity of the sentiment for a document. Optimally, a document sentiment vector space for a topic may be constructed in advance from historical documents pertaining to the topic using historical data of one or more selected extrinsic metrics proximate to the publications date of the respective historical documents. The sentiment polarity of contemporaneous publications can then be established in near real-time by their similarity to historical documents in the action regions of the sentiment vector space.

Action regions in the document sentiment vector space can be identified that infer a high degree of sentiment polarity toward the topic. Documents located proximate to these action regions may be further analyzed for the occurrences of sentiment-significant words, terms, and phrases across several of the documents having a high degree of sentiment polarity. The co-occurrence of specific words, terms, and phrases within many documents populating the action regions of the sentiment vector space gives them a position within a high-dimensional vector space which corresponds with specific events common within those documents. Words with hidden sentimental meanings toward the topic can be uncovered from this analysis. The specific event is related to the manner for assessing sentiment. If sentiment polarity of the training set is determined from a word meaning analysis of intrinsic occurrence of words in the training documents, then the hidden sentimental meanings will relate to a latent semantic meaning. If, on the other hand, sentiment polarity is determined from movement in the value of some extrinsic metric ostensively precipitated by publication of the document, then the hidden sentimental meanings will forecast future movement in the value of that metric.

Objective predictions of the sentiment polarity to a topic for contemporaneous publications can be made in advance of the public's sentiment reaction to the documents using the historical document sentiment vector space for the topic. Contemporaneous publications relating to the topic, typically those published within some predefined timeframe of influence from the publication date, are processed in mass. Only contemporaneous publications forecast as having a high degree of the sentiment polarity toward the topic, according to a sentiment score obtained from analysis in the historical document sentiment vector space, will be considered. The contemporaneous publications with the highest sentiment scores are rank ordered and returned. Other publications, those with a neutral sentiment polarity are disregarded from ranking.

The objective sentiment score of any publication can be supplemented by weighted subjective sentiment scores derived from the opinions of others on the sentiment of the publication toward the topic, such as a trusted group with some expertise on the publication, topic or both, or a less trusted communal group. The sentiment scores are combined as a cumulative sentiment score prior to document ranking. Finally, with regard to assessing sentiment by measuring it affect on an extrinsic metric, because the sentimentality of a document toward a topic may affect the value of the extrinsic meter over only a limited timeframe of action influence, the character of that influence may be used as a time decay algorithm and applied to the cumulative sentiment score. Consequently, a publication's sentiment score will approach zero near the expiration of the timeframe of action influence.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 19 is a flowchart depicting a method for analyzing the sentiment of contemporaneous publications in accordance with an exemplary embodiment of the present invention.

Figure 1:
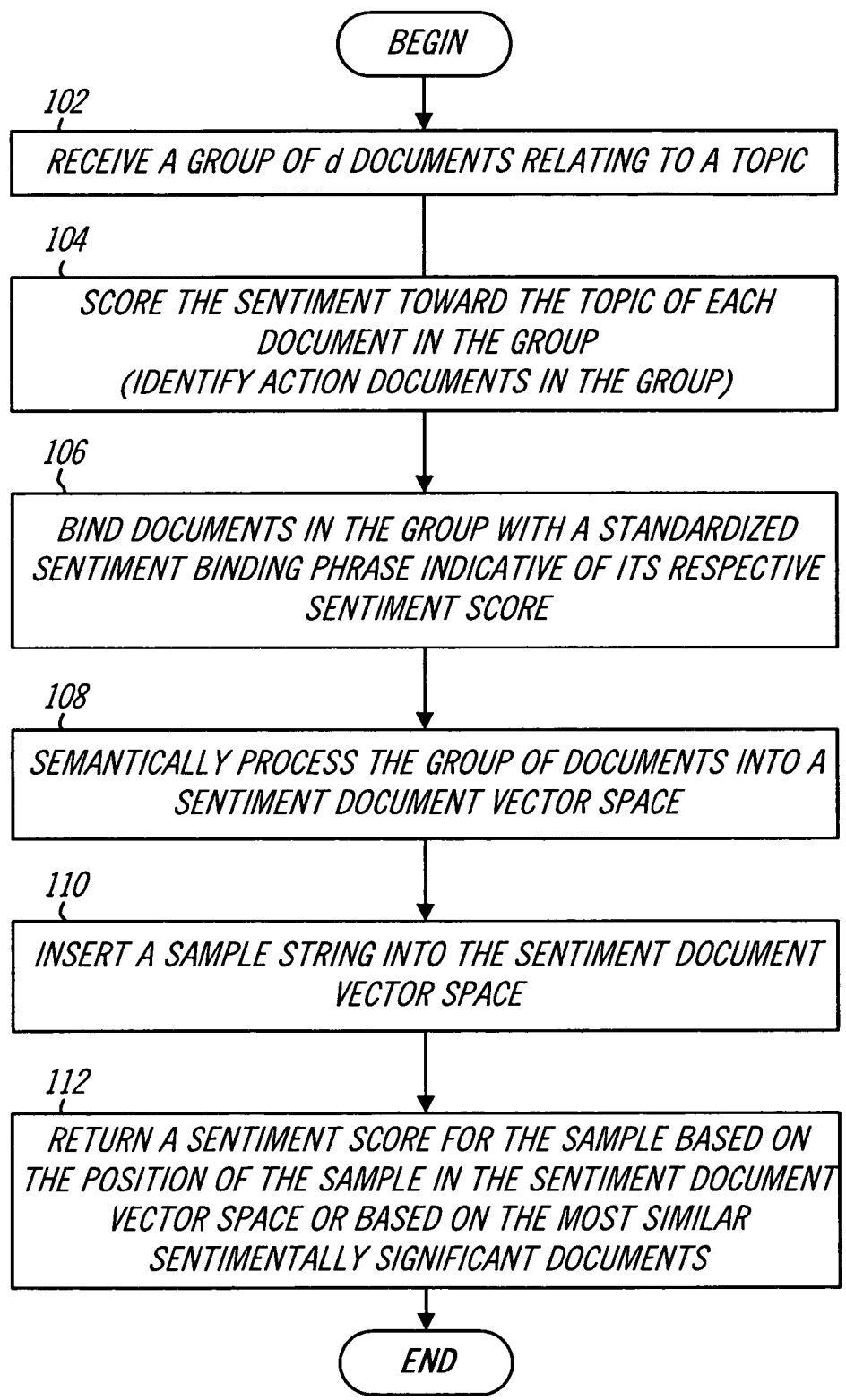
FIG. 1 is a flowchart depicting a process for assessing the sentimentality of a word string by using a document sentiment vector space in accordance with an exemplary embodiment of the present invention.

Other features of the present invention will be apparent from the accompanying drawings and from the following detailed description.

DETAILED DESCRIPTION OF THE INVENTION

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

In common document analysis practices, sentiment measures are typically employed to measure a specific polarity—either positive or negative—using one of several techniques that look at specific word usage or patterns of words to indicate a positive or negative tone. The meanings for terms, words, phrases and tones of a document convey an overall sentiment, or polarity of a document. Typically, these words are predefined in a lexicon or synonym list. Similar to movie reviews, typical sentiment measures indicate a like or dislike relative to the common understanding of good and bad. For instance, a review may contain text that states "this was the best movie I've seen in years". The occurrence of the word "best" or phrase "best movie" could be used by typical sentiment models to indicate a positive review. Conversely, a review may contain words indicating the disfavor of the reviewer, such as "this was the worst movie I've seen in years". Here, the words "worst" and "worst movie" are interpreted by prior art sentiment models to indicate a negative review.

In general, prior art sentiment models use the common meaning of the lexicon to derive sentiment from the intrinsic terms of a document. Sentiment models rely on the intrinsic sentimentality conveyed by the meanings of words, terms, and phrases. Text that has no sentimental meaning or tone cannot be used to influence the sentiment of a document even though there may be cases where it can be indicative of sentiment. For instance, a movie review with the phrase "I forced myself to stay until the end," has a negative tone even though it does not contain any overtly negative terms. Hence, unless the sentiment model has been modified to include the terms "I forced myself to stay" as having a negative sentiment, the phrase will be disregarded in the sentiment determination of the document. Moreover, the use of prior art sentiment models is, generally, based on the plain meaning of terms, words or phrases for their sentiment value. Hidden and latent sentiment meanings are difficult to assess and even problematic to implement as a sentiment model. For instance, the use of sarcasm in a document may skew the overall sentiment assessment of an article. For example, a reviewer referring to a movie as "the best movie I've ever seen—not" will be interpreted as having a positive sentimental meaning, even though the remainder of the review might be overwhelmingly negative. In this case, the sarcastic remark will negate some of the negative sentiment in the article, resulting in a more neutral sentiment assessment. Furthermore, since prior art sentiment models are based solely on the subjective connotation of sentiment meanings of intrinsic terms and phrases, at best. The mere supposition that an article has a subjective sentiment assessment from the occurrence of certain terms and phrases may not be determinative.

One benefit of using sentiment models is that they can be constructed in advance and therefore, the intrinsic sentimentality of most newly published documents can be assessed immediately upon publication, or in near real-time, on the fly. However, intrinsic sentiment measurement techniques, such as sentiment models, suffer from shortcomings associated with evolving and/or ethnic, cultural or geographic variations in word meanings, homographic understanding (a word with multiple meanings) and alternate or synonymic word meanings. Hence, the models should be updated frequently with current variations in sentiment word meanings, sentiment tones and even document specific sentiment definitions. In any case, even the most advanced sentiment models rely on the administrator of the model for its meanings. Words that have no overt sentimentality cannot be assigned sentimental meaning unless that meaning is recognized by the administrator and implemented in a lexicon list for the model. Therefore, it word be advantageous to implement a sentiment measurement methodology that does not heavily rely on the overt sentimental meaning of individual terms, words and phrases in a single document.

In accordance with one exemplary embodiment of the present invention, a sentiment algorithm is presented for assessing sentimentality by constructing a document sentiment vector space. The creation of a document term vector space for searching documents and terms is well known and is described generally in U.S. Pat. No. 4,839,853 issued to Deerwester et al. and U.S. Pat. No. 6,847,966 issued to Sommer, et al. As these general teachings are helpful in implementing the present invention, they will be discussed briefly below. In constricting any document term vector space for a group of documents, it is sometimes helpful to reduce the number of document terms in order to decrease the computational complexity of the process. Words without semantic meaning (or sentimental meaning for the present invention) may be omitted prior to creating the term-by-document matrix (sometimes referred to as a term frequency document matrix) that represents the frequency of term occurrence in the group of documents, such as stop words or non-content words like "are, in, is, of, the, etc." For some latent semantic analysis (LSA) models, additional preprocessing steps are undertaken to reduce the number of unique terms in the matrix even further, which simultaneously increases the word occurrence of others. One means is by grouping all terms that have identical underlying roots to their unique root word, such as "troubling, troublesome, troublemaker, trouble, etc.," grouped to the unique root word "trouble." Other techniques involve the grouping of group synonyms and concept phrases to a single related term, such as grouping "sole, only, unique," as a single synonymic word or grouping "Information Highway," "Information Technology" and "Data Mining" as a single concept word. While these types of groupings are possible with regard to the present invention, it should be appreciated that the primary purpose for constructing a document sentiment vector space is to make sentiment comparisons and these types of comparisons may not necessarily correlate to the sentiment meanings of the document terms. Therefore, grouping roots, synonyms and concept phrases should be attempted only in cases where all terms in a group convey an identical sentiment toward the topic. There are cases where grouping document terms is proper and can be implemented without affecting the sentiment meaning of the group terms, such as sequentially occurring terms that have different meanings when they occur non-sequentially in the document. For instance, the terms "stock market" can be grouped as a single term "stockmarket" in cases where the term "market" is immediately proceeded in the document by the term "stock."

The Deerwester et al. patent describes an analysis method that utilizes a semantic document vector space represented in a term-by-document matrix that represents the frequency of local term occurrence per document (i.e., the local term weights) in the group of documents. Conversely, the Sommer, et al. patent describes an analysis method that utilizes a representative semantic space represented in a weighted term-by-document matrix that represents the frequency of local term occurrence per document and the global term occurrence per the group of documents (i.e., the local term weights and global term weights) in the group of documents. Either analysis method will suffice, as will other well known analysis techniques for making semantic comparisons of documents by representing them as document vectors in a document vector space. Ultimately, what is desired is a term vector description of documents so that the documents can be semantically compared to one another through a vector operation on the document vectors.

In either case, the aim is to construct a term-by-document matrix (referred to hereinafter as Matrix A) from a group of d documents, with regard to the present invention, all of the documents all relate to a particular subject matter or topic. Matrix A represents the local frequency of occurrence of each term per document. It is useful in constructing the term-by-document matrix, to create an ordered term dictionary of all terms occurring in the group of documents (or the reduced set of terms). The terms dictionary will form the column term arrangement and the documents the rows arrangement. Essentially, a term document Matrix A can be thought of as the set of column document vectors (document vectors $D_1$-$D_d$) for documents contained in the group of documents and a set of row term vectors for the terms in the documents (term vectors $T_1$-$T_t$).

Matrix A can then be decomposed, such as by using any well known singular value deposition, into three separate matrices: a term-by-concept Matrix $T_0$ (t×m); a singular value concepts Matrix $S_0$ (m×m); and the transpose concepts-by-document Matrix $D_0^T$ (m×d); such that Matrix $T_0$ has orthogonal, unit length columns such that $T_0^T T_0 = I$, Matrix $D_0$ has orthogonal, unit length columns, where Matrix $D_0^T$ is the transpose of Matrix $D_0$ such that $D_0^T D_0 = I$ and Matrix $S_0$ has orthogonal unit length columns such that $S_0^T S_0 = I$, where Matrix I is the identity matrix, and where t is the number of unique terms in the group of documents, d is the number of documents in the group, and m is the rank of Matrix A (the larger of the number of documents d or terms t in Matrix A) and the number of unique semantic concepts between the terms, such that Matrix A=(Matrix $T_0$)×(matrix $S_0$)×(Matrix $D_0^T$).

It should be mentioned that the present invention defines actionability in the action documents in the semantic document vector space and not the individual terms. Hence, sentiment scoring typically requires a comparison to one or more vectors of action documents or vectors representing the action area of the semantic document vector space. Therefore, Matrices $T_0$ and $D_0^T$ are useful for making similarity comparison, and, thereby, for sentiment scoring terms and documents based on the semantic document vector space represented by term-by-document Matrix A. For example, the semantic similarity of any two documents in the group can be determined from the dot product of their representative document vectors in Matrix $D_0$. This is sometimes useful in identifying the most semantically similar action document for a non-action from the group of documents. If the actionability is desired for a document that does not occur in the group of documents used to construct the semantic document vector space, a pseudo vector for representing the subject document in the semantic document vector space must be created from terms that co-occur in the subject document and the documents of the group of documents. Essentially, a vector representative of the subject document is created from the term vectors from Matrix T of the co-occurring terms. That document vector can then operate in the semantic document vector space of Matrix A similar to any document vector doe documents from the group.

Matrix A is an extremely large matrix with m concepts, many of which are weak and undefined. These concepts are of little use in similarity comparisons, but greatly increase the complexity of working with Matrix A. Therefore, only the k strongest concepts need be considered, so the (m−k) weakest concepts are discarded and the dimensions of the Matrices $T_0$, $S_0$ and $D_0^T$ are reduced to (t×k), (k×k) and (k×d), respectively to form Matrix T, Matrix S and Matrix $D^T$; where reduced concept Matrix Â=(Matrix T)×(Matrix S)×(Matrix $D^T$). Matrices T and $D^T$ are used for making semantic comparisons and creating vectors defined in the semantic document vector space in an identical manner as discussed above with regard to Matrices $T_0$ and $D_o^T$ discussed above.

Subsequent to preprocessing the document terms, an ordered dictionary of t terms occurring in the documents is created that describes the occurrence of terms in the group of documents. The local weight of each term can then be determined for a document by the frequency a term occurs in that document. Local weights are included in the term-by-document Matrix A for showing term frequency in a document.

The Sommer et al. patent describes further processing Matrix A prior to reducing the concepts by applying a global log entropy algorithm to Matrix A to produce a weighted term dictionary of ordered terms with the global weights for term occurrences across the entire group of documents. The term global weights are then included in the term-by-document matrix with the local weights and the weighted term-by-document Matrix A is decomposed, such as by using any well known singular value deposition such that matrix A will form matrix $T_0$, Matrix $S_0$ and transpose Matrix $D_0^T$. The number of concepts is reduced from m to k as discussed above and reduced concepts Matrix Â may be recomposed from matrices $T_0$, $S_0$ and $D_0^T$.

Importantly for the present invention is the existence of the term matrix $T_0$ (sometimes referred to as the matrix of left singular vectors), matrix $S_0$ (sometimes referred to as the matrix of singular values), the transpose document matrix $D_0^T$ (sometimes referred to as the matrix of right singular vectors) and the ordered term dictionary of term occurrence. These matrices can be used for the construction of pseudo document vectors from sample documents that are not contained in the original reduced concepts Matrix Â, such as by $D_q = A_q^T T S^{-1}$, where $D_q$ is the pseudo document vector for the sample document, $A_q^T$ is the transpose of a document vector created from the term frequency for each term occurring in sample document $d_q$ also occurring in Matrix Â. The pseudo document vectors can then be used with the document vectors from Matrix A for making semantic similarity comparisons between the sample documents and documents from the original group of documents.

The semantic document vector space represented by the reduced concept term-by-document Matrix Â is useful for making semantic comparisons of documents represented in the space, through the dot product of their respective document vectors, i.e., the product is actually a cosine between the vectors. For instance, the semantic similarity between the documents $d_i$ and $d_j$ can be found by finding the dot product between the two document column vectors representing the documents, column vector $D_i$ and column vector $D_j$, which exist in Matrix Â corresponding to documents $d_i$ and $d_j$, respectively. Since the dot product is actually a cosine between the document vectors, as the value of the product approaches "1.0," the two documents are aligned in the same area (one over another) in semantics space, and closely related in semantic similarity.

The present invention uses the semantic document vector space as a basis for constructing a special-case semantic document vector space referred to hereinafter as a sentiment document vector space. The sentiment document vector space can then be analyzed for sentiment relationships between the documents represented in the sentiment document vector space or with a sample document not represented in the sentiment document vector space. The sentiment document vector space can also be queried for sentiment information or for documents that exhibit a heightened sentimental significance toward a topic or subject matter for the group of documents represented in the sentiment document vector space. That is to say, once constructed, the special-case document term vector space may be queried for useful sentiment information and sentiment relationships it may contain, but the sentiment space may also be used for measuring (or scoring) the sentiment of sample terms, words, phrases and entire documents.

Essentially, the construction of the document term vector space discussed above is modified to form a sentiment document vector space. This is achieved by the addition of a sentiment dimension as one of the high order term dimensions in the document term vector space. At this point in the discussion, it is immaterial how the sentiment of each document is measured, the only criterion is that the sentimentality of each document in the group of d documents be measured and included in the respective documents. One mechanism for including a sentiment dimension is by using a "binding-phrase" method—adding in a specific word or phrase to a document to identify the sentimentality of that document. That binding phrase is then one of the terms in the document and is processed into the term-by-document matrix as an additional row term vector as described above, giving the document vector sentiment space a $t^{th}+1$ term.

In the d documents of a group of documents, t unique terms will occur in the original documents. The addition of one binding term for sentiment, say term $t_a$, (the sentiment binding-phrase) increases the number of unique terms to (t+1) terms. The document sentiment vector space may be understood as two separate sets of documents, action documents (those with sentiment binding-phrases) and non-action documents (those documents without binding labels). Documents that have been determined to have a sentential significance will be referred to alternatively throughout this disclosure as "action documents," for reasons that will become apparent. Of the d documents in the group, a documents will have sentiment binding-phrases (where d>a) and the d documents will have (t+1) unique terms, however, but all a action documents will have the sentiment binding-phrase $t_a$. The local weight of the sentiment binding-phrase $t_a$ will be exactly 1.0 in the a action documents and exactly 0.0 in the d−a non-action documents of the group. The global weight of $t_a$ will be exactly a ratio of a/d.

It is useful to consider the frequency of term occurrences and co-occurrences in the a action documents to determine the sentential significance of a specific term, word or phrase that co-occurs in some or many of the action documents. A term $t_x$ may have some sentential significance only if that term occurs in at least one action document. The higher the occurrence frequency of the term, the greater its sentential significance toward a topic. Similarly, the higher the co-occurrence in multiple action documents, the higher its degree of sentential significance. The combination of a high occurrence frequency and co-occurrence frequency further increases a document's sentential significance toward a topic. However, because the document sentiment vector space contains both action documents and non-action documents, the global occurrence frequency of the term is not necessarily determinative. What is more important in signifying sentential significance is a high frequency of occurrence and co-occurrence in action documents and a lower frequency of occurrence and co-occurrence in non-action documents. However, the mere fact that a term exhibits a higher frequency of occurrence and co-occurrence in non-action documents does not preclude that term from sentential significance, to the contrary, some terms, words or phrases that have a high frequency of occurrence and co-occurrence in non-action documents, may also have sentential significance toward the topic if they co-occur in many action documents. Terms that occur in the action documents without any apparent relationship to sentiment to the topic should not be dismissed out of hand. In some cases, the sentimental meaning for these terms is not explicit, but the terms usage in the action documents contains some latent sentiment meaning toward the topic.

One useful mechanism for evaluating the strict sentential significance of words is by analyzing word occurrence frequencies in only the action documents without considering their semantic meanings. This can be accomplished by creating a second term-by-document matrix for only the action documents, Matrix $A_a$, and a separate action term dictionary for the q unique terms that occur in the a action documents (it is assumed that not all of the t unique terms will occur in the action documents, (t≧q)). Term occurrences and co-occurrences can be analyzed directly from Matrix $A_a$ and the ordered action term dictionary for any sentential significance. Furthermore, matrix $A_a$ can be decomposed as discussed above into separate term, concept and document matrices if necessary. Moreover, the Matrix $A_a$ contains column document vectors representative of the a action documents which enables the construction of a singular sentiment vector representative of the area in the sentiment document vector space over all a action documents. Furthermore, action area of the singular sentiment vector representative can be further distilled into an uber-location of that sentiment in the space from the vector for the binding phrase that runs through the action space. As briefly discussed above, the use of a binding phrase action vector will greatly reduce the complexity of vector operation over the more complex singular sentiment vector that is representative of the entire action area of the semantic document vector space. Sample documents can be vectorized, using the pseudo vector method discussed above, and then semantically compared to any of the a action document vectors for assessing the semantic similarity to the respective documents (usually retained as a sentiment score of between 0 and 1.0), or alternatively the sample document vector can be semantically compared to the singular sentiment vector for the Matrix $A_a$. In either case, the semantic similarity to a vector having sentential significance can be taken as a sentiment score for the sample string.

The precise phrase-binding technique may vary, however, the sentiment phrase selected for use in the action documents should be a standardized sentiment binding-phrase that has local and global weights of 0.0 in the group of d documents, i.e., the sentiment binding-phrase is unique and, therefore, has an occurrence frequency of 0.0 in the group of d documents. An example of a standardized sentiment binding-phrase is "high_sentiment_polarity," alternatively, even some unique alpha-numeric character string may be employed, e.g., snoop46923388dog. In any case, the purpose of the standardized sentiment binding-phrase is to tag any document that has significant sentimentality with a unique term-phrase that defines a sentiment dimension in the sentiment document vector space by the inclusion of an additional row term vector for the sentiment binding-phrase. The remaining non-action documents in the group of d document will not have the standardized sentiment binding-phrase and, therefore, will not occupy a position along the sentiment dimension of the sentiment document vector space, i.e., the non-action column document vectors will have a 0.0 weight at the sentiment binding-phrase term, while the action column document vectors will have a 1.0 weight at the sentiment binding-phrase term. The use of a document sentiment vector space as a measure of the sentimentality of a sample string will be more apparent by a discussion of the process depicted flowchart in FIG. 1.

FIG. 1 is a flowchart depicting a process for assessing the sentimentality of a word string by using a document sentiment vector space in accordance with an exemplary embodiment of the present invention. As mentioned immediately above, the construction of the document sentiment vector space allows for two basic types of sentiment analysis: mining sentiment information directly from the sentiment document vector space (i.e., using query strings and the like, and/or analyzing patterns of term occurrence and occurrence frequencies using column document and row term vectors and/or the term dictionaries); and comparing a sample string of terms, words, phrases, or even entire documents to the document sentiment vector space for semantic similarities from which sentimentality may be inferred (i.e., comparing vectorized representations of the sample string of terms, words, phrases, or documents with document column vectors and/or row term vectors from the term-by-document Matrix A representing the document sentiment vector space).

The process begins by assembling a group of d documents that are all related to or somehow germane to a particular topic or subject matter (step 102). From the onset, it should be appreciated that the intent of constructing the document sentiment vector space is to measure the sentimentality toward a topic or subject matter, so all documents in the group should be relevant to that topic, that is, have some relationship to the topic. Although, as will be understood from the discussion further below, the topic may not necessarily be overtly mentioned in some of the documents in the group. In addition to being relevant to the topic, the documents in the groups should also be sentimentally relevant toward the topic. Within this training set of d documents will be a reduced set of t terms that occur in at least one document, with some of the terms co-occurring in multiple documents in the group.

Also, the documents should be sentimentally relevant. Relevancy is a somewhat difficult concept to define as its scope and character may change with the particular topic for the group of documents. One mechanism that may be useful in determining relevance is the document's publication date; documents are relevant to a particular topic if published over a predetermined time period. Documents that are too new or too old are excluded from the group of documents as not being a particularly relevant indication of sentiment toward the topic. Is so doing, only the more temporal sentiment meanings for the publication date will be defined by the document sentiment vector space. As a practical matter, it is possible to select groups of documents over specific time periods for constructing different document sentiment vector spaces, for instance the most recent six month period, the next most recent six month period, etc. Furthermore, the group of documents may be a static group or a dynamic group. A static group is populated with a discrete number of documents that will not change, while the document members of a dynamic group will constantly change, and consequently, the document sentiment vector space will be reconstructed or modified for the changes in the group of documents. For example, a historical group of documents may be selected for a specific publication time period, that group will remain static as no other documents will be published over that period. However, if the group is dynamic, such as in a rolling time period (i.e., published during the most recent six month period), documents are added and/or subtracted to the group over time. The concept of relevance will become more important below with the discussions of intrinsic measurements and extrinsic measurements of sentiment. In accordance with aspects of the present invention, the publication date for a document may accompany the document as data, or be explicitly contained within the context of the document. However, a document's publication date need not be explicit. In some instances, the publication date may be inferred from or implied by the document, its context, from its availability from the author, publisher or media source, or from some other information. Alternatively, if a document's publication date is not explicit, inferred or implied, a publication date may be assumed for the purposes of practicing the present invention based on some evidence of publication or knowledge of the media publication practices, the author, publisher, etc. The point is that in some regards a publication date will be needed for practicing the present invention, hence, the term "publication date" will refer to any date applicable to the publication of the document. Clearly, more accurate sentiment analysis results can be expected from using a more accurate publication date.

Next, the sentiment toward the topic is assessed for each of the d documents in the group (step 104). The sentiment of each document in the group may be determined using any of a number of sentiment determination techniques, either intrinsic measurements or extrinsic measurements of sentiment. It should be appreciated that intrinsic sentimentality may be derived from a mere nebulas tone of the document's internal semantics, or may be further based on the document's tone directed toward the topic or subject matter that the document is related. Optimally, the measure of intrinsic sentimentality is the document's tone toward the particular topic or subject matter (e.g., a person (as an athlete, entertainer, politician, humanitarian, etc.), political party, product, film, equity, finance, cause, complaint, patent, sport's team, country, etc.).

Scoring document sentiment polarity may be somewhat artful and may utilize a discrete scale of sentimentality, or an incremental scale. The sentimentality of a document toward a topic may be defined as being significant or insignificant. That is, the document has some sentimental importance, i.e., scored as an action document and will receive a sentiment binding-phrase. Sentimentality may also be assessed as a polarity, sentimentally significant documents will exhibit either a "positive" sentiment toward a topic or a "negative" sentiment toward a topic. Using this basis, documents with either positive or negative sentiment polarity scores will be actionable and will receive a sentiment binding-phrase. Documents with neither positive nor negative sentiment have a neutral sentiment toward the topic and, therefore, have a "neutral" polarity toward the topic. Typically, a predefined sentiment threshold will be applied to the value of the extrinsic metric (or a change in the value of the metric) for determining actionability. For example, a 5% change in prices, or sales volume of a change over an average price of sales volume for a period. If the price exceeds the sentiment threshold, then the document is considered an action document.

In some cases, it is beneficial to map changes in the value of the metric to a an incremental sentiment scale rather than merely scoring the document as an action document, i.e., a sentiment score −1.0 to +1.0, in 0.1 increments per percentage of change in the value, with negative sentiment being −1.0 and positive sentiment being 1.0. Sentiment thresholds can then be established for determining which documents have a significant sentimentality toward the topic (the action documents). Those documents will receive the sentiment binding-phrase. For example, if what is being sought is all documents with a positive sentiment toward a topic, documents with a historical sentiment_score>0.4 might be sentiment-labeled as action documents, wherein 0.4 is the sentiment threshold for the topic. Alternatively, if what is being sought is all documents that exhibit a negative sentiment toward the topic, documents with a historical sentiment_score<−0.4 might be sentiment-labeled as action documents. Still further, if only documents with a non-neutral sentiment are to be considered, then documents having a historical sentiment score of 0.4<sentiment_score<−0.4 will be sentiment-labeled. There may even be other instances where only documents with a neutral sentiment are to be considered, in those cases documents with a historical sentiment score of 0.4>sentiment_score>−0.4 will be sentiment-labeled.

With the sentimentally significant documents in the group of d documents being determined from a historical sentiment score, the action documents are signified from sentimentally insignificant documents by the inclusion of a sentiment binding-phrase that is indicative of the sentiment polarity (step 106). This step adds a unique sentiment term to the context of sentimentally significant (action) documents. The unique sentiment term used is a sentiment binding-phrase and the binding phrase defines the unique term as a sentiment dimension for the group of d documents subsequent to processing into a document sentiment vector space.

The next step is to process the group of documents, including the action documents, into a document sentiment vector space, i.e. construct an (t+1)xd term-by-document Matrix A (step 108). In a typical document vector space, a group of d documents with t unique terms will have t term dimensions, however the $(t+1)^{th}$ term, the sentiment binding-phrase term $t_s$, adds an additional dimension in the document term vector space that simultaneously correlates to a newly created sentiment dimension for the vector space. For instance, the sentiment binding-phrase positive_polarity adds the $(t+1)^{th}$ term "positive_polarity" to the context of the action documents that provides a unique term for segregating the sentimentally significant documents from the remainder of the documents in the group. The additional term also defines the positive_polarity sentiment dimension of the term-document space (now the document sentiment vector space). Documents that include the sentiment binding-phrase positive_polarity are action documents and the area proximate to the positive_polarity axis in the document sentiment vector space is the action area for that document sentiment vector space. Any sample document (related to the topic of the group of documents) that's representative of a document vector transposes into the action area of the document sentiment vector space, will have some sentimental significance. Conversely, if the representative vector of a document does not coincide with any of the action area, then that document is sentimentally insignificant toward the topic. As a practical matter, the frequency of term co-occurrences between a sample document and the singular sentiment vector is a measure of sentiment toward the topic. Alternatively, the frequency of term co-occurrences between the sample document and an action document is also indicative of sentimentality toward the subject. Therefore, by using the document sentiment vector space, the sentimental significance of other documents related to the topic for that space can be assessed based on their semantic similarity to the action documents in the document sentiment vector space, or more correctly, based on the proximity of their vector representation to the action area(s) of document sentiment vector space.

It is also possible to create multiple sentiment dimensions in a document sentiment vector space as discussed briefly above. Defining multiple sentiments for a topic may be helpful in narrowing the gamut of sentimentality toward a topic, such as positive sentiment and negative sentiment, or levels of positive or negative sentimentality. For example, sentimentally significant documents from the group with a historical sentiment_score>0.4 might be labeled with a "positive_Polarity" binding phrase, wherein 0.4 is the positive polarity sentiment threshold for the topic, while other sentimentally significant documents from the group with historical sentiment_score<−0.4 are labeled with a "negative_polarity" binding phrase, wherein −0.4 is the negative polarity sentiment threshold. Hence, the group of d documents now has (t+2) unique terms and (t+2) term dimensions, the $(t+1)^{th}$ and $(t+2)^{th}$ dimensions now correlate to the sentiment dimensions of positive_polarity and negative_polarity. As discussed above, action areas proximate to the positive_polarity and negative_polarity sentiment axes will have sentimental significance, albeit of opposite sentiment polarities. The relevance of multiple sentiment dimensions to sentiment measurements in the present invention will be discussed further below.

With the construction of the document sentiment vector space, individual document vectors representative of each of the a action documents can be identified in the term-by-document Matrix A from the presence of a binding-term value in the vector. Additionally, a singular sentiment vector that is representative of all a action documents in document sentiment vector space can then be created from all of the action document vectors. These action document vectors can be useful for identifying terms, words and phrases with high sentiment value, as well as determining sentiment relationships between the terms and documents. Additionally, the action document vectors are used for assessing the sentimentality of other sample terms, strings or documents through semantic comparisons. Typically, a sample string is vectorized consistent with the document sentiment vector space using the ordered term dictionary (or a pseudo document vector created), which is inserted into the document sentiment vector space (step 110). The representative sample string vector can then be semantically compared to any of the document vectors for the a action documents, or to the singular sentiment vector, for similarity (step 112), i.e., for determining the position of the representative sample string vector in the document sentiment vector space for the topic.

Additionally, the sample document may be similarity scored against all other documents in the document sentiment vector space for the most similar document in the group.

Documents, publications and articles can be identified as "similar" using a variety of techniques, including keyword similarity, Latent Semantic Analysis (or variants), vector space models, probabilistic measures (Bayesian, PLSA), through the dot product of their respective document vectors, i.e., the cosine between the vectors, or others. The semantic similarity between the vectors provides a basis for a sentiment score, e.g., the cosine between the vectors. Although other similarity comparison techniques are known, three types of similarity comparisons will be discussed with respect to the present invention for determining the sentiment of a sample from a document sentiment vector space the sample/singular sentiment vector similarity scoring method (e.g., the cosine between a representative sample vector and a representative singular sentiment vector for the entire document sentiment vector space); the sample/action document similarity scoring method (e.g., the cosine between a representative sample vector and a representative document vector for an action document); and the sample/action document with an incremental sentiment score (e.g., a sum of the cosine between a representative sample vector and a representative document vector for an action document and the sentiment score for the action document). It should be appreciated that optimally the cumulative sentiment score for a sample string should take into account both the semantic similarity between the sample vector and the document vector and also the magnitude of the sentimental significance of the comparison vector. In most instances, the action document will be scored discretely, assumed a 1.0, with non-action documents having a discrete score of 0.0. For that case, the scores of all action documents are identical and so the present invention relies entirely on the similarity score. In other, less prevalent instances, the training documents may have an incremental sentiment score, usually between 0.0 and 1.0 in increments of 0.1. In those instances, both the sentiment score and the sentiment score of the training document being compared to, will be used for the sentiment score. For example, if the similarity score between a training document vector having a sentiment score of 0.83 and a representative sample vector is 0.8, then the optimal sentiment score of the sample string would be some combination of the 0.83 similarity score and the 0.8 sentiment score, perhaps their product. As mentioned above, however, in many instances all action documents will be assigned a sentiment score of 1.0, as is the singular sentiment vector for the document sentiment vector space. For those situations, e.g., the sample/singular sentiment vector similarity scoring method and the sample/action sentiment scoring method, the sentiment score for a sample is derived entirely from the similarity score.

Accurately assessing document sentimentality toward a topic is a significant deficiency of the prior art sentiment models due to their reliance on the somewhat subjective common meanings of the lexicon to derive sentiment. Assuming even that a sentiment model presented an extremely accurate assessment of that document's sentiment toward a topic, it cannot be known for certain that a reader will be in agreement. What is needed is a more objective means for measuring the sentiment of a document toward a particular topic, or for testing the reader's sentiment toward the topic of the document.

One mechanism for objectively measuring the sentimentality of a document is by measuring an affirmative response by the readers to the topic. Readers may be subjected to polls or inquiries for their sentiment on a topic after reading a document. Reader polls and surveys are bothersome for the respondents and reflect only the opinions of those taking the time to complete it, and hence, somewhat inconsistent. A more accurate gauge of sentiment toward a topic is an unsolicited, but affirmative action on the part of a reader that relates to the topic of the document. Ideally, this action is extrinsic to the document, i.e., as opposed to an intrinsic measure of sentimental from the meanings of the terms in the document. Therefore, an extrinsic metric is chosen that both relates to the topic and requires an affirmative and intentional action by the readers that can be quantified. For example, on the topic of a particular consumer product, sales rate for the product would be a suitable extrinsic metric to track. Variations in the sales rate of the product immediately subsequent to the publication of review of the product provides a more objective and accurate assessment of document sentimentality than a mere sentiment model. The readers will buy or not buy the product (the affirmative action) based on their sentiment toward the product on the basis of the recent publication. Monitoring an extrinsic metric (such as a sales rate) is a far better assessment of sentiment to a topic because the reader reinforces the sentimental significance through the intentional action of buying the product. In another example, on the topic of a particular publicly traded equity (stocks, bonds, futures contracts, financial instruments, etc.), variations in the price of the equity and/or the trading volume immediately subsequent to the publication of an article concerning the equity also provides an objective assessment of the reader's sentiment toward the equity based on the publication.

Clearly, some constraints should be implemented in order to ensure that changes in the value of the extrinsic metric are directly related to the sentiment of the reader toward the topic from reading a related article or publication. For instance, care should be taken in the selection of a proper extrinsic metric for measuring sentiment, action thresholds should be established for changes in the value of the metric that are indicative of significant sentiment and a timeframe for monitoring the extrinsic metric should be identified where changes in the value of the metric would reasonably infer the sentimentality from reading the publication. Therefore, in accordance with one exemplary embodiment of the present invention, a document sentiment vector space is constructed from sentiment polarity measured from an extrinsic measure of sentiment to a topic that accurately reflects the readers' sentiment toward a topic. Optimally, the document sentiment vector space is constructed from a group of training documents in which the accurate records of pertinent metrics are known and readily available; these training documents are referred to alternatively hereinafter as historical documents. The construction of this space will be better understood with reference to the description of the process shown in the following figure.

Figure 2:
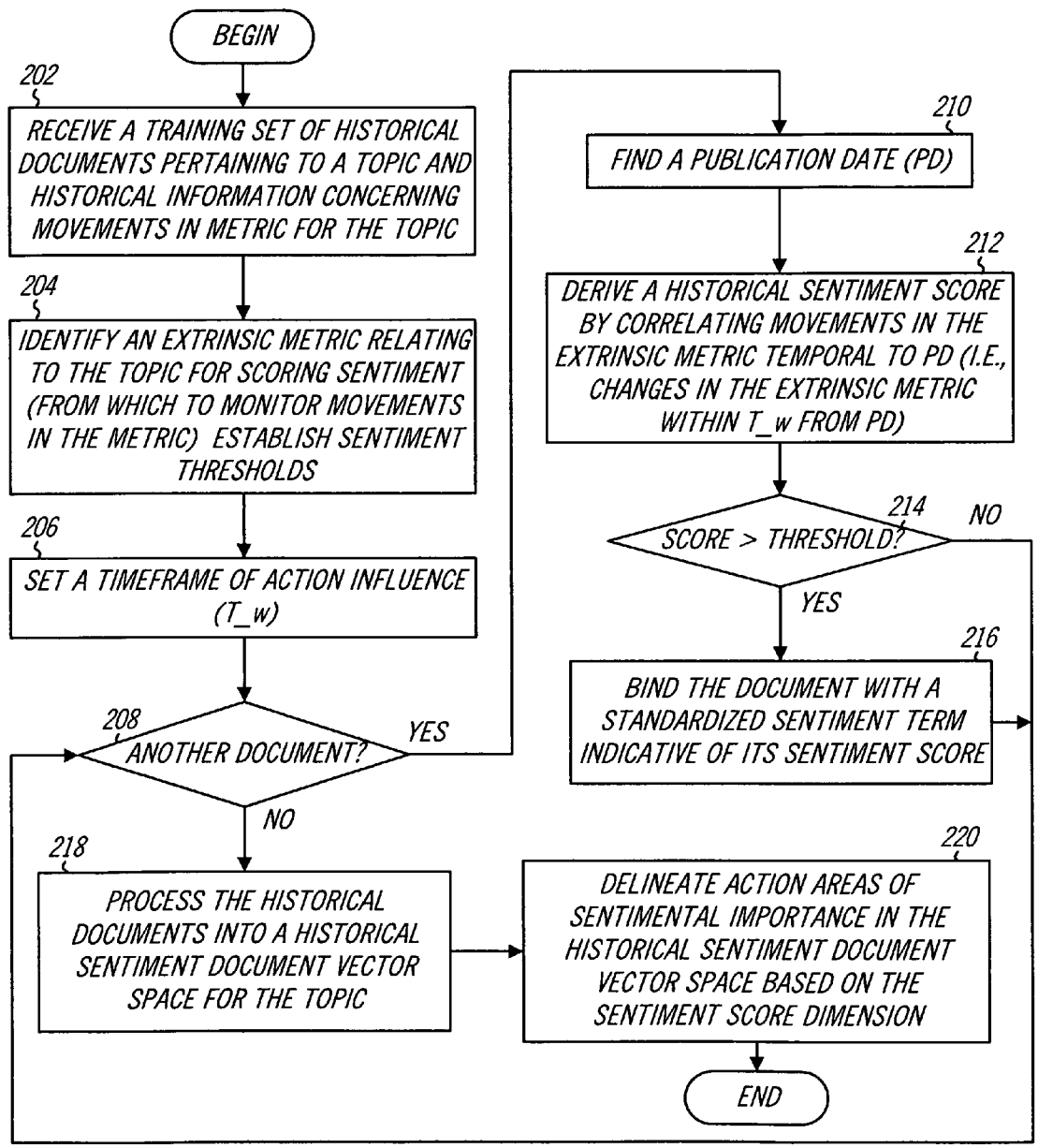
FIG. 2 is a flowchart depicting a process for constructing a historical document sentiment vector space for gaining some insight on the historical sentimentality of the topic and/or measuring the sentimentality of a sample term string using the historical document sentiment vector space as the standard in accordance with an exemplary embodiment of the present invention.

FIG. 2 is a flowchart depicting a process for constructing a historical document sentiment vector space for gaining some insight on the historical sentimentality of the topic and/or measuring the sentimentality of a sample term string using the historical document sentiment vector space as the sentiment standard. Initially, a training set of documents pertaining to a topic is assembled (the group of d documents) (step 202). Historical documents can take many forms, for instance articles, publications, periodicals, postings or other writings, electronic forms of hard copies, electronic documents, transcripts of oral communications, online documents, blogs and forums, even financial statements, conference/earning calls, advisories, warnings and reports. Historical documents and may pertain to virtually any topic that invokes a sentiment in humans. To be included in the training set, each document must satisfy three conditions: the document pertains to a particular topic consistent with the group (the topic need not always be mentioned internally); the publication date for the document is known; and data are available for movements in the value of a metric relating to the topic proximate to the publication date.

The extrinsic metric to be monitored for change is then selected (step 204). The choice of metric to monitor should bear a direct relationship to sentiment of a reader and its value will change by some affirmative action undertaken by the reader that can be measured. For instance, if the topic for the group of historical documents selected is a political party, then a appropriate metric for measuring sentiment toward the political party might be the quantity or rate of new voters registration affiliations to the party; if an particular publically traded equity is selected as a topic, then an appropriate metric for measuring sentiment toward the equity might be the trading price of the equity, the number of shares traded over a timeframe, the acceleration/deceleration of trading volume or price, etc. Sentiment thresholds for the value of the metric are established that signify significant sentiment toward the topic. For most metrics, movements or changes in its value should be bifurcated at least between sentimentally significant changes and sentimentally neutral changes; a threshold value between the two can be established. For others metrics, changing values may further reflect positive sentiment, neutral sentiment and negative sentiment and appropriate sentiment thresholds selected between each sentiment polarity.

Next, a timeframe of action influence (T_w) is determined for the extrinsic metric for monitoring changes in its value (step 206). T_w may be measured in days, weeks or even hours and its duration is predicated on the length of time that a publication will reasonably influence the sentiment of its readers toward the topic. For instance, T_w of a review on the topic of a particular type of automobile may be significantly longer than the T_w of an article concerning a particular equity; i.e., weeks versus days. It should also be mentioned that the commencement of T_w monitoring period may not coincide exactly with the publication date, PD, of the document; it may precede the PD somewhat to account for insiders' knowledge of the document's content.

Once the basis for measuring sentiment from the extrinsic metric has been formulated, the historical sentiment for each document in the training set may be scored (this sentiment score is referred to hereafter as a historical sentiment score for the document). A new document is retrieved from the set (step 208) and its PD ascertained (step 210). Next, the historical sentiment score for the historical document is determined by correlating movement in the extrinsic metric temporal to PD and over T_w (step 212). As mentioned above, the period for monitoring the value of the extrinsic metric may commence at PD or slightly subsequent to PD, and extends until the expiration of the T_w timeframe. These pre-publication changes in the value of the extrinsic metric usually result from insider knowledge of the document's content, as well as rumors or expectation of its content and are highly suggestive of the sentiment toward the topic based on the content of the document. The concept of a timeframe of influence T_w attributable to the sentimental influence of the publication of a particular document on an underlying extrinsic metric is important, not only for assessing the sentiment scoring the historical documents in the training set of documents, but also in scoring the sentiment of contemporaneous publications using the document sentiment vector space constructed from the training set (discussed below with regard to FIGS. 10 and 14).

Returning to the FIG. 2, the historical sentiment score is obtained for the document and compared to the sentiment threshold for the extrinsic metric to the topic (step 214). If the historical sentiment score does not exceed the sentiment threshold for the extrinsic metric, then the document is not of any sentimental significance toward the topic and the process revert to step 208 for considering another document. If, at step 214, the historical sentiment score exceeds the sentiment threshold for the extrinsic metric, then that document is considered to have sentimental significance toward the topic, an action document, and labeled with a standardized sentiment term indicative of the sentiment score (step 216) (see the examples above). The process then returns for another document until of all the documents in the training set have been scored and sentiment-labeled where appropriate (step 208).

Next, the historical documents are processed into a historical document sentiment vector space using any well known method, including one of those discussed above (step 218). With the construction of the historical document sentiment vector space, areas of high sentimental importance (action areas) can be delineated that have high sentimental importance for the topic (step 220). Action areas in the document sentiment vector space are proximate to the positions of the a action document vectors in the space. Additionally, these action document vectors can be coalesced into a singular sentiment vector representative of the cumulative action area in the sentiment document vector space over all a action document vectors.

The process for constructing a semantic document vector space depicted in FIG. 2 will most often be repeated a regular intervals because sentimentality, as defined by the historical documents, will change over time. Consequently, the singular sentiment vector representative of the action area for the space, as well as the binding phrase vector, are dynamic concepts. Changes in their positions in the document sentiment vector space can be measured over time with respect to a sentimentally fixed object, such as a representation of a query string or document.

Figure 3:
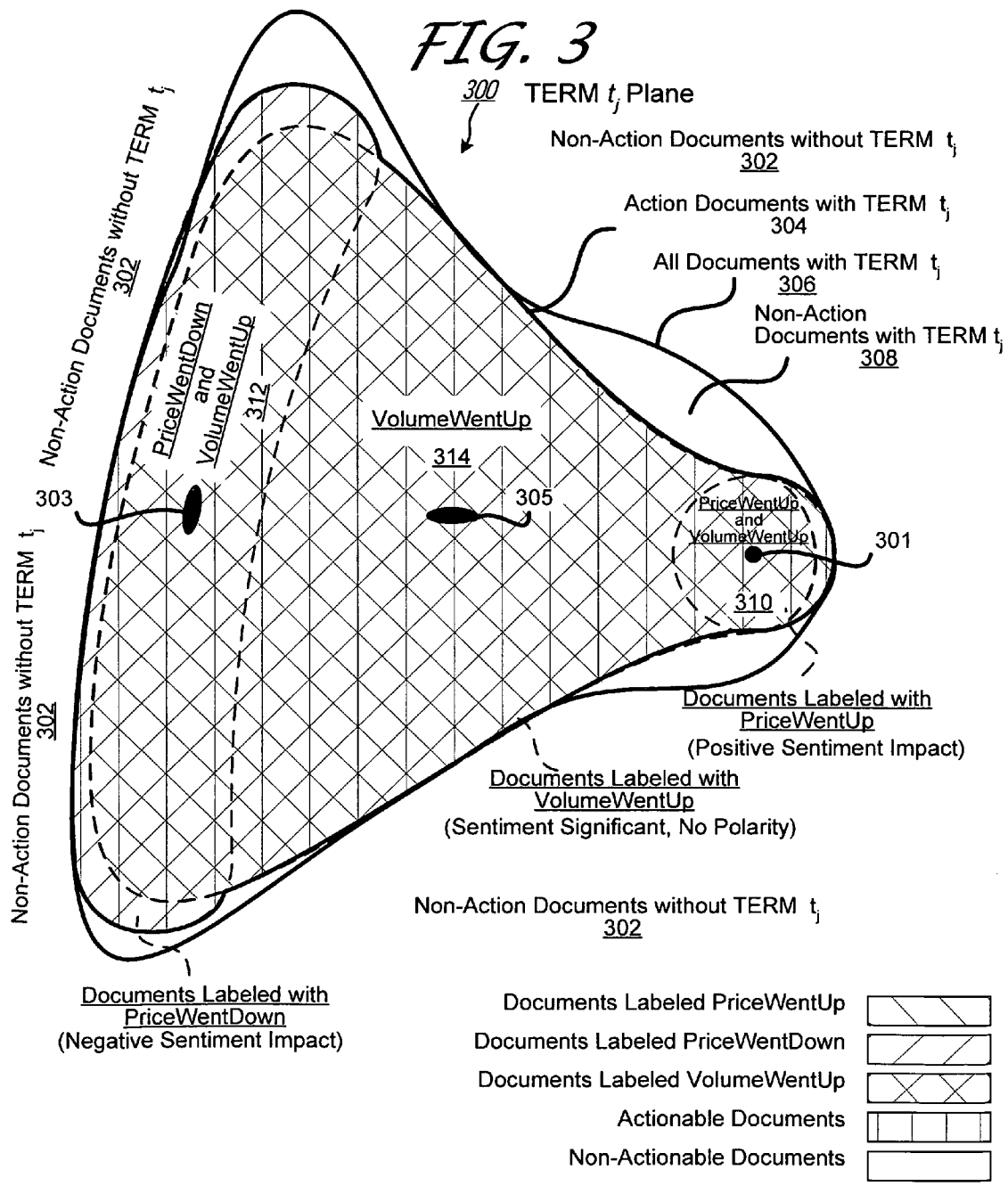
FIG. 3 is a graphic representation of an exemplary historical document sentiment vector space constructed with reference to a particular equity topic taken at a plane perpendicular to the Price_Went_Up sentiment axis in accordance with an exemplary embodiment of the present invention.

FIG. 3 is a graphic representation of a plane of an exemplary historical document sentiment vector space constructed with reference to a particular equity topic. Here, the topic for the documents is a particular equity and the exemplary plane is perpendicular to the Price_Went_Up sentiment axis. That plane is the term $t_j$ plane; every document represented in this plane contains the term $t_j$. All document vectors that subtend the plane are represented points within the plane. Other documents, not containing the term $t_j$, are outliers to the term $t_j$ plane and are not represented in the diagram. These documents may be action documents, as well as non-action documents, but simply do not contain term $t_j$.

The present example is a complicated representation of a document sentiment vector space with multiple sentiment dimensions. In most situations, a single sentiment dimension will suffice for determining the sentiment scores of sample strings and other contemporaneous publications, and provide a fertile space for mining historical sentiment information and relationships concerning the topic. However, a description of the present, more complicated multi-polarity diagram, will aid in understanding the advantages of a document sentiment vector space for assessing the sentiment of sample documents toward a topic.

It should be appreciated that a document sentiment vector space has a high multidimensional structure, containing (t+b) unique terms, where t is the quantity of unique terms in the d documents and b is the quantity of unique standardized sentiment binding terms that were included in the a action documents that are represented in the vector space, hence b unique sentiment polarities. In the example, two extrinsic metrics are monitored for ascertaining sentiment of the historical documents toward the topic, the trading price of the equity and the trading volume for the equity. Three sentiment polarities are labeled from the measured values of the two metrics; Price_Went_Up and Price_Went_Down from the trading price, and Volume_Went_Up from the trading volume. Price_Went_Up represents the readers' positive sentiment toward a topic as exhibited as an increase in the price of the subject equity. Conversely, Price_Went_Down represents the readers' negative sentiment toward the topic as manifest as a decrease in the equity's price over timeframe T_w. Finally, Volume_Went_Up represents significant sentimentality of the readers toward the topic, however it is difficult to ascertain if the readers' sentiment has a positive or negative polarity. These sentiment polarities are represented in document sentiment vector space 300 as Price_Went_Up action area 310, Price_Went_Down action area 312 and Volume_Went_Up action area 314. Optimally, the action areas can be distilled into vector representations of the respective binding terms, the binding term vectors, that are more easily manipulated, for example PriceWentUp vector 301, PriceWentDown vector 303 and VolumeWentUp vector 305. Areas of coincidence between the Volume_Went_Up action area 314 and the Price_Went_Up action area 310 may be inferred as positive sentiment toward a publication, while areas of coincidence on between the Volume_Went_Up 314 and Price_Went_Down 312 action areas may be inferred as negative sentiment toward the equity.

Notice from the diagram that Price_Went_Up action area 310 proximate to the Price_Went_Up axis is approximately circular and semantically (see the legend for diagram shadings), which is primarily due to the view point orientation being coaxial to the Price_Went_Up axis in the document sentiment vector space. The size of each of the action areas is representative of the co-occurrence frequency of term $t_j$ in action documents labeled with a standardized sentiment binding term. A singular sentiment vector can be created that is representative of all sentiment represented in the space based on all terms that occur (co-occur) in the action documents, e.g., Price_Went_Up 310, Price_Went_Down 312 or Volume_Went_Up 314. As discussed above, documents from the group of documents are represented as document vectors from the term-by-document Matrix A. Vector representations for non-historical documents, such as sample terms, or strings, or sample documents such as articles, publications, postings or other writings and sample documents, can be constructed for the topic from the decomposed matrices from Matrix A or the ordered term dictionary, may also be inserted into the document sentiment vector space. A sentiment score for a sample document may be realized by a semantic comparison of similarity of the representative document vector to the sample to the singular sentiment vector for the document sentiment vector space. The sentimentality of a sample document may be diagrammatically represented by the position of its representative sample document vector in the document sentiment vector space. For example, representative sample/document vectors that traverse the Price_Went_Up action area 310 have at least one term co-occurring with the action documents labeled Price_Went_Up; if the coincidence occurs at the term $t_j$ plane, then the term $t_j$ co-occurs in the Price_Went_Up action documents and the sample string or document represented by the vector.

If a document contains only terms co-occurring in the action documents labeled Price_Went_Up, that representative document vector would reside entirely in Price_Went_Up action area 310 (but across multiple term planes). The semantic similarity of that representative document vector to the Price_Went_Up sentiment polarity would high, exhibiting a similarity score near 1.0. Notice from the diagram that the action areas Price_Went_Up 310 and Price_Went_Down 312 are essentially mutually exclusive with no (or only a slight) coincidence, while the action area for Volume_Went_Up 314 is coincidental to much of the Price_Went_Up and Price_Went_Down action areas (310 and 312). This make logical sense since significant changes in an equity's price are often accompanied by high trading volumes. As a practical matter, because T_w is finite, there may be instances where equity's price fluctuates across both the positive polarity and negative polarity thresholds. This may be due to factors affecting the equity other than the sentiment toward the publication. Dual sentimentality may be alleviated by setting T_w sufficiently short to eliminate oscillating sentiment cycles, or, alternatively, using only the first or longest traversal of a sentiment threshold for determining the sentiment binding term and/or eliminating distinctions between negative and positive polarities.

Returning again to the diagram in FIG. 3, notice that cumulative action area 304 is formed by the Price_Went_Up, Price_Went_Down and Volume_Went_Up action areas (310, 312 and 314) is roughly triangular shaped. This is the action area in the document sentiment vector space associated with term $t_j$ as it is coincides with occurrences of term $t_j$. Outside that action area is non-action area 308 that is also coincident with occurrences with term $t_j$ occurs, however documents in this area do not have a sentiment binding label and, therefore, are not action documents. This area represents the occurrences of term $t_j$ in non-action documents. The proportion of the occurrence frequency in action areas to the occurrence frequency in an action area in the exemplary diagram has sentimental importance for the term $t_j$, the higher the frequency of co-occurrences of term $t_j$ in the action documents to the frequency of co-occurrences of the term in the non-action documents, the more sentimentally significant term $t_j$ is to the topic. Notice that the remainder of document sentiment vector space 300 is populated by non-action documents without term $t_j$ 302. This area of document sentiment vector space 300 is essentially undefined for term $t_j$ as the documents represented in this area do not contain the term.

The construction of a document sentiment vector space forms the basis for different analysis techniques for assessing the sentiment of a document toward the topic. Essentially, the definition of a document sentiment vector space for a topic provides a sentiment standard for documents relating to the topic. From that construction, the sentiment analysis can take a variety of divergent paths.

Figure 4:
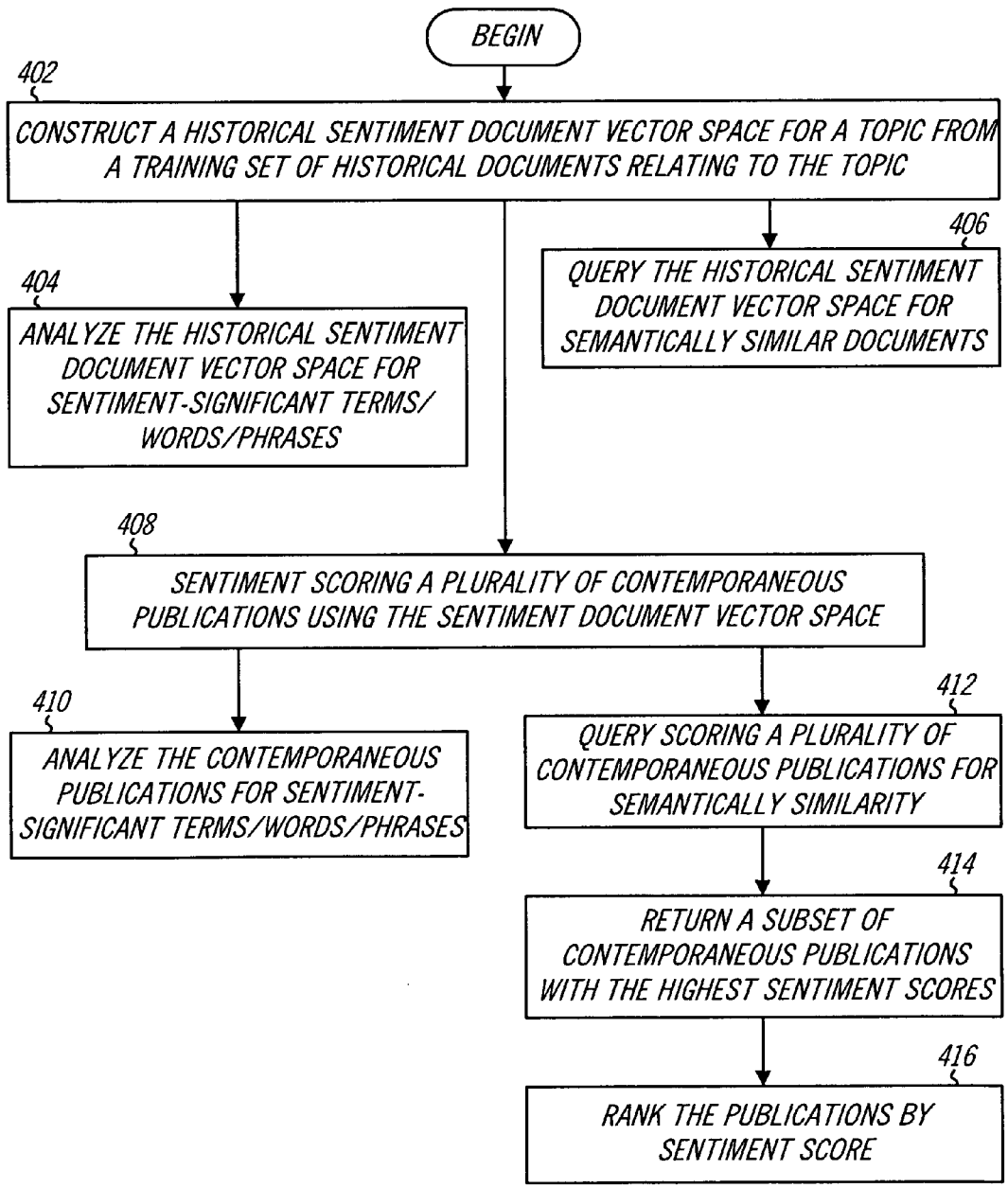
FIG. 4 is a diagram of a flowchart of a process for implementing various sentiment analysis techniques using a document sentiment vector space in accordance with an exemplary embodiment of the present invention.

FIG. 4 is a diagram of a flowchart of a process for implementing various sentiment analysis techniques using a document sentiment vector space in accordance with an exemplary embodiment of the present invention. The process begins with the construction of a document sentiment vector space for a particular topic by using a training set of documents that are relevant to the topic (step 402). As discussed above, sentimentality of the document sentiment vector space may be defined through intrinsic measurements of the documents meanings, but optimally, measuring movements in an extrinsic sentiment metric may be a more accurate indicator of sentiment. By using a training set of historical documents, a historical document sentiment vector space is created that defines sentimentality to the topic for that historical time period.

With the historical document sentiment vector space in place, it is possible to analyze the document term vectors for the occurrence of terms and the co-occurrence frequencies of terms in multiple documents (step 404). Some terms that have no overt sentimental meaning and might not even seem particularly relevant to the topic, may exhibit a higher than expected co-occurrence frequency across many action documents (or in the singular sentiment vector that represents the action area of the document sentiment vector space). These terms/words/phrases are understood to have a latent sentimental meaning for the topic. For example, on the topic of a particular political candidate, a re-occurring term in many action documents might be a particular position, view or stand that the candidate is associated with. The reoccurrence of a particular view associated with the candidate in many action documents will indicate a high degree of sentiment toward the topic of the candidate for the view, i.e., a "hot button issue" for that particular candidate. Further analysis of the action space may indicate whether the issue has a negative sentiment polarity or a positive sentiment polarity for the candidate. Such a sentiment analysis will allow the candidate to reform his public persona to emphasize the positive sentiment issues and deemphasize the issues that carry a high negative sentiment. In another example on the topic of a particular political candidate, another re-occurring term in many action documents might be the name of a particular person that the candidate is somehow connected. The sentimentality of documents containing references to that person would dictate how the readers perceive the candidate's affiliation to that person and the candidate's public persona with that person might be adjusted accordingly.

Another significant feature of the historical document sentiment vector space is the ability to query the historical document sentiment vector space for sentimental meanings or for semantically similar documents, from which sentiment inferences may be understood (step 406). There may be occasion for understanding the sentimental impact of a sample term, word, phrase, statement, speech or document before utterance. The sentimentality of any sample set of terms to the topic can be assessed by querying the document sentiment vector space with the sample string of the terms for historical documents in which the string occurs. The position of the returned historical documents in the historical document sentiment vector space is indicative of the sample's sentimentality or its "actionability" toward the topic. The set of documents returned can be further constrained through the use of a query term, for example, finding the most semantically similar documents in the historical document sentiment vector space to a particular sample document, and that contains a specified term.

Additionally, sample documents can be semantically compared to the historical documents to identify the most semantically similar document(s) in the document sentiment vector space for the topic. If the most similar document to a sample is an action document, then the sample document will likely exhibit a high degree of sentimentality toward the topic also. Similarly, the sample documents may be inserted document sentiment vector space, via a representative sample document vector for the sample. Its position in the document sentiment vector space will be indicative of the sentimentally of the sample toward the topic. Pragmatically, this may be accomplished through a semantic comparison of the representative sample document vector to a singular sentiment vector representative of the action area in the document sentiment vector space. A high similarity score is indicative of heightened sentiment toward the topic.

Another use of a historical document sentiment vector space is to rapidly predict the sentimentally of newly published articles from historical sentiment indications as manifest in the historical document sentiment vector space (step 408). Contemporaneous publications are semantically compared to the historical document sentiment vector space for a sentiment score using any one of the three comparison methods discussed above (sample/action document similarity scoring method, sample/action document similarity/sentiment scoring method and sample/singular sentiment vector similarity scoring method). The contemporaneous publications are sentiment scored (essentially by their semantic similarity to action documents, or areas, in the document sentiment vector space), those publications with significant sentimentality may be signified as action publications (based on the sentiment scores or by some other reference to sentiment). In this case, however, the sentimentality of the contemporaneous publications is predictive, or a forecast of the potential sentimentality of the publication, based on a historical sentiment reference defined by the historical document sentiment vector space. As such, the sentimentality of newly published articles and other documents toward a topic can be forecast before any change in the extrinsic metric is realized. Prognosticating a shift in sentiment is an important business, political, and nationalistic tool as it enables the possessor of this sentiment information to position herself for the change or, alternatively, take remedial action to counter or mitigate the predicted change in sentiment.

One useful feature of the historical document sentiment vector space is that it provides an automated sentiment basis for sorting newly published documents for further scrutiny. In many industries, professionals must review an unmanageable number of news and technical articles each day just to keep current. Not all of the articles are particularly relevant to the user. One metric for parsing out irrelevant articles is through the sentiment of the article toward a topic; articles that generate little sentimental interest are considered irrelevant to the topic they pertain. Hence, contemporaneous publications identified as actionable in step 408 are of particular interest to a user interested in the topic.

Once a group of contemporaneous publications are sentiment scored, they may be analyzed for sentiment in much the same manner as described above with regard to the document sentiment vector space as depicted in steps 404 and 406. However in this case, the sentiment scores are predicated on historical sentiment indications as manifest in the historical document sentiment vector space rather than from changes in an extrinsic metric. Consequently, action contemporaneous publications can then be analyzed for terms, words and phrases having significant sentiment (term occurrence, a high frequency occurrences or co-occurrence in many action publications) similar to that described above for the action historical documents (step 410). It may be helpful to create a separate term-by-document Matrix A for the contemporaneous publications, an ordered term dictionary, or even a weighted term dictionary. The dictionaries and document vectors for the contemporaneous publications can then be analyzed for terms occurring in the action publications, having a high frequency of occurrences, or co-occurring in many action publications, that may be identified as having sentimental meaning toward the topic. Terms with sentimental meaning for the contemporaneous publications, but that either do not occur in the action historical documents, or have a relatively low co-occurrence frequency in the action historical documents, are of particular interest as these terms may have a sentiment meaning to only the contemporaneous publications toward the topic.

The quantity of action publications identified from the historical document sentiment vector space may be substantial and in need of further paring. Not all contemporaneous publications with a high semantic similarity score to the action area of the historical document sentiment vector space may be of interest. The quantity of action publications returned from the comparison may be further constrained and prioritized through sentiment scores, querying and sentiment ranking. At step 408, the actionable contemporaneous publications have been identified through some semantic similarity scoring to action areas/documents in the historical document sentiment vector space, hence the actionable publication are sentiment-scored. The actionable publications returned may be further constrained by semantic similarity to an additional query string (step 412). As a practical matter, the sentiment-scored contemporaneous publications may always be compared to one or more query strings relating to the topic, such as a default query. A default query is selected such that it will return all actionable publications identified as such in step 408. More constrained query strings are also possible. For example, a query string may contain a specific term, for instance some term with latent sentimental meaning (such as in steps 404 and 410 above).

Alternatively, the query may contain a user tag or a keyword label associated with the topic. User tags or keyword labels are words, terms and phrases that are attributed to a document by one or more readers, see the discussions of the methods depicted in FIGS. 16, 17 and 18. In general, tags have some semantic relationship to a publication, i.e., the tag or its root will occur in the publication or the tag is synonymous to a sentiment meaning of the publication or its topic. Tags may also describe sentiment toward the topic based on the document. Some tags are a more reliable indication of sentiment than others, such as those identified by a trusted individual or group for the topic. Additionally, a tag word that is repeatedly mentioned in association with many actionable publications may be considered more relevant than a tag that is mentioned in only a few actionable publications. Similarly, some tags have more relevance to the topic than others. Tag relevance may be measured in any one of the following means: semantic similarity to the action documents or action publication; the frequency that the tag is selected by readers for a document/publication; tag relevance rating/scoring by readers; and semantic similarity to other tags or keyword labels for the publication.

Clearly, the availability of tags to a user provides additional query options that may not have been considered by the user. Furthermore, in certain situations reliable user tags may be used for an automated query or as a supplement to a user query without. For example, a set of contemporaneous publications are queried by a user. A plurality of contemporaneous publications is returned in response to a user query with a high occurrence tagged with a particular tag. That tag may be assumed to be relevant to the original query even though not included in the query string. In that case, the present invention may automatically query the set contemporaneous publications with the tag and return any action publications not included in the plurality of contemporaneous publications returned from the original query. Using this methodology, the supplemental query is based on a relevant content summary and/or sentiment description of the returned action contemporaneous publications that was provided by other readers. Consequently, using the user tags, it is possible to query a document set by content, even though the user may not have a full contextual understanding of documents. It should be understood that although the tag-based query has been described with reference to searching a set contemporaneous publications, it is equally applicable to any document set, such as a group of historical documents.

Returning again to FIG. 4, the set of contemporaneous publications may be query-scored for the semantic similarity to a query string (step 412). The query score may be compiled, in some manner, with the (predictive) sentiment score of each contemporaneous publication for a cumulative representation of the sentimental significance of a publication to the topic with respect to the tag. Optionally, non-action and irrelevant publications can be parsed out and a set of relevant action publications identified (step 414) and returned. The returned relevant set of action publication can then be ranked according to actionability (step 416).

Actionable publications, which are generally synonymous with publications having a sentimentally significance toward the topic, although generally without reference to any particular sentiment polarity, are of most importance to a busy professional with only limited time to devote to the daily reading chore. Ideally, a user will maintain requests for actionable publications in several topic areas of interest. One or more queries for each topic may also be derived by the users for further parsing only the most relevant action publications. Each day, the present invention will compare all contemporaneous publications to the historical document sentiment vector space for sentiment and return the most relevant ranked set of sentimentally significant contemporaneous publications for each topic. Users can then scan the relevant publications, those that are particularly pertinent based on the query, reading only the highest ranked articles.

The construction of a historical document sentiment vector space that defines sentimentality toward a topic, from temporal change in the value an extrinsic metric, is a central concept for the present invention. It is possible to define sentiment in the historical document sentiment vector space as a discrete action area, or as a plurality of discrete areas, each area having an action area representing a documents having high sentimental significance. However, the construction of the sentiment vector space can take one of a variety of forms: a single sentiment polarity measured by a single metric (discussed above); multiple sentiment polarities measured by a single metric (also discussed above); multiple sentiment polarities measured by a respective multiple metrics (also discussed above) or even a gradient of multiple incremental sentiment polarities measured by a single metric. A method for constructing historical document sentiment vector space using a single sentiment polarity measured by a single metric is depicted by the flowchart shown in FIG. 5, while a method for constructing historical document sentiment vector space using a gradient approach for defining sentiment polarities measured by a single metric is depicted by the flowchart shown in FIG. 6. The method used for constructing historical document sentiment vector space shown in FIG. 5 can be repeated in separate iterations for disparate sentiment polarities, either using the same or different metrics for measuring sentiment. Conversely, the method used for constructing historical document sentiment vector space shown in FIG. 6, is used exclusively for the gradient approach for defining a spectrum of sentiment polarities as measured from a single metric, but may also be reiterated for different extrinsic metrics. As should be apparent from a brief review of the two flowcharts, the methodology depicting in the flowchart shown in FIG. 5 will generate a document space where some documents will not be bound with a sentiment binding label, hence by using this technique, the action area of the vector space is essentially defined prior to the creation of the document space by the designation of action historical documents. Alternatively, by the methodology depicting in the flowchart shown in FIG. 6, every document in the document vector space will be bound with an additional term for the sentiment binding label, although some of these labels will not be indicative of high sentimental significance, but of neutral sentiment. Furthermore, action area in the document sentiment vector space can be defined by documents with different sentiment binding labels, for example if the sentiment threshold is set at 0.8, the documents bound with the sentiment binding labels sentiment_0.8, sentiment_0.9 and sentiment_1.0 would all qualify as action documents and the action area document sentiment vector space could be represented by singular sentiment vector compiled from the document vectors of all documents having the three sentiment binding labels. Furthermore, by using the methodology of the flowchart shown in FIG. 6, action areas in the historical document sentiment vector space can be defined or redefined at anytime, not merely when the historical document are compiled, by merely querying sentiment labels with the prerequisite sentiment levels and then compiling a singular sentiment vector for the action area of the historical document sentiment vector space.

Figure 5:
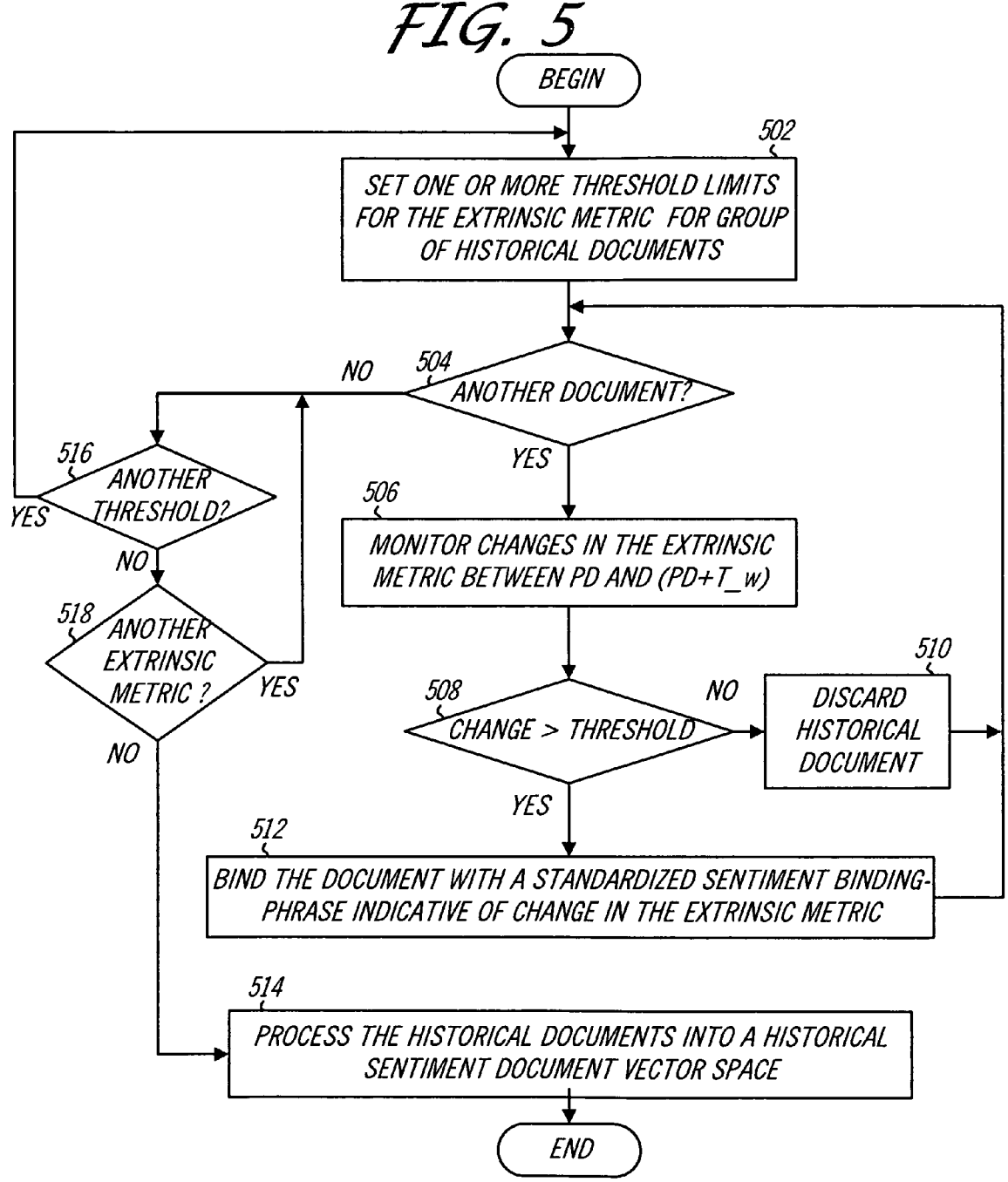
FIG. 5 is a flowchart depicting a method for constructing historical document sentiment vector space using a single sentiment polarity as measured by a single metric in accordance with an exemplary embodiment of the present invention.
Figure 6:
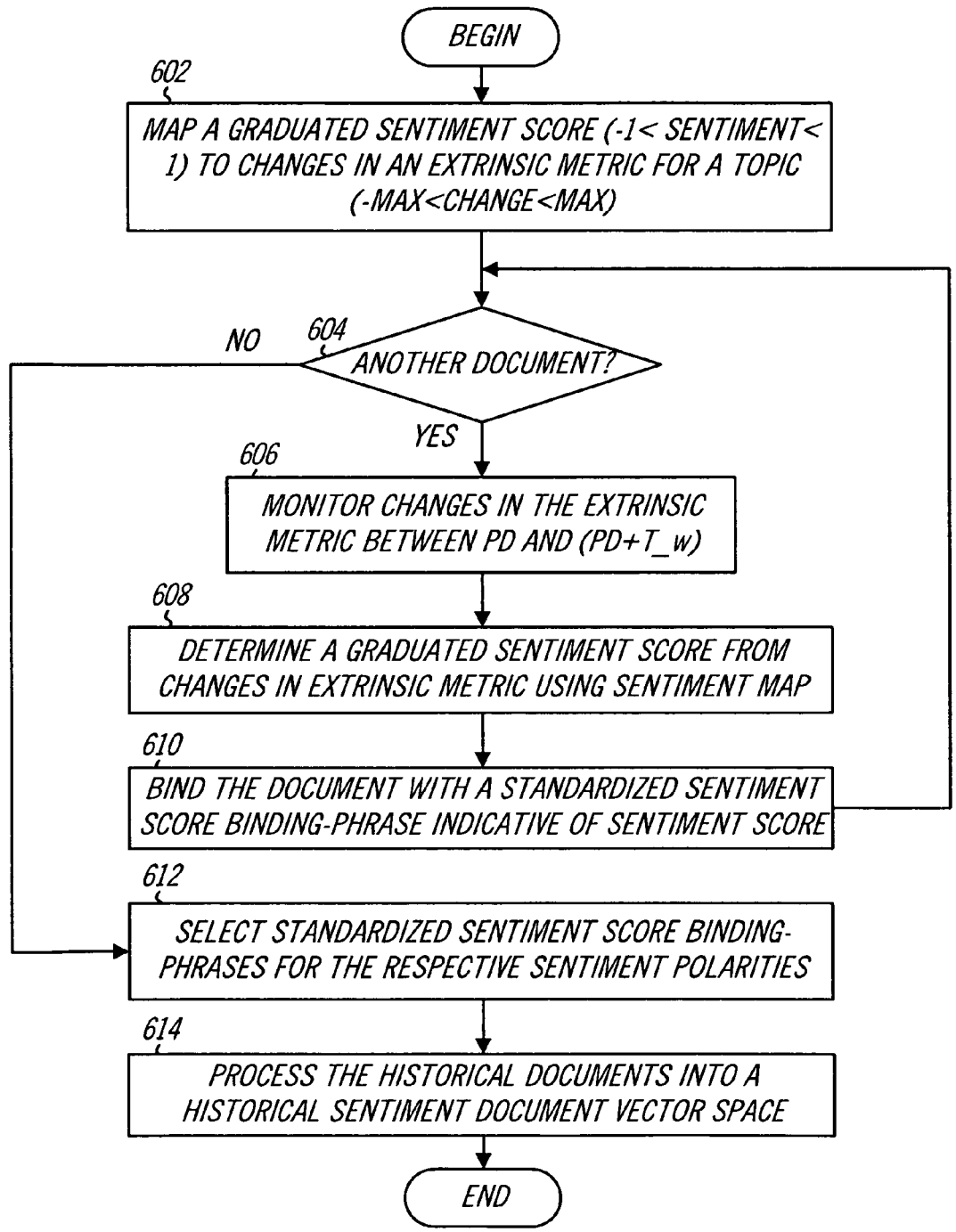
FIG. 6 is a flowchart depicting a method for constructing historical document sentiment vector space across a range of sentiments by using a graduated sentiment scale in accordance with an exemplary embodiment of the present invention.

FIG. 5 is a flowchart depicting a method for constructing historical document sentiment vector space using a single sentiment polarity as measured by a single metric in accordance with an exemplary embodiment of the present invention. The process begins with the assembly of a group of historical documents related to a particular topic. As discussed above, the publication date, PD, of each document should be known, as well as data relating to an extrinsic metric used for assessing the sentiment of a particular historical document proximate to its publication date. A sentiment threshold limit is set for comparing the value of the extrinsic metric, proximate to PD and over the timeframe T_w (step 502). As mentioned elsewhere above, the sentiment threshold limit will discriminate action historical documents, those with sentimental significance, from non-action historical documents, by the value of the extrinsic metric. A historical document is selected from the group (step 504) and the value of the extrinsic metric is monitored proximate PD and across timeframe T_w (step 506). The monitoring period may begin at PD, or slightly subsequent to PD. Changes in the value of the extrinsic metric are compared to the threshold limit selected at step 502, and if the sentiment threshold is not traversed by the value of the metric, the historical document is considered a non-action historical document and discarded from further processing (step 510), at which time the process reverts to step 502 to check for another historical document. If, at step 508, the threshold is traversed by the value of the metric over the timeframe T-w, then the historical document is considered an action historical document, with sentimental significance toward the topic. The context of the action historical document is bound with a standardized sentiment binding phrase that describes the change in the values of the extrinsic metric, for instance, for the topic of a consumer product, the extrinsic metric selected for assessing sentiment might be gross sales. In that case, the sentiment threshold would be a sales target amount and an exemplary standardized sentiment binding phrase for a positive sentiment polarity might be High_Sales. The selection of the standardized sentiment binding phrase should ensure that the phrase is unique from any other term that may occur in the group of historical documents.

The process then reverts to step 502 for another historical document. If another historical document exists in the group, the process iterates through step 504 through 512 as necessary until the sentiment toward the topic of all of the historical document in the group has been checked. If no other sentiment thresholds are to be tested (step 516) and no other extrinsic metrics checked for the group of documents (step 518), the documents are processed into a historical sentiment document vector space for the topic (step 514). The construction of the historical sentiment document vector space is discussed at length above, however, several useful tools may be derived from the space, including: a frequency term-by-document matrix A; a term dictionary; an action weighted term dictionary; weighted term dictionary; a reduced concept term-by-document matrix $\hat{A}$; decomposed reduced concept term-by-concept matrix T (t×k); decomposed reduced concept singular value concepts matrix S (k×k); and the decomposed transpose reduced concept concepts-by-document matrix $D^T$ (k×d), representative document vectors for the action documents; and singular sentiment vector representative of the action area of the historical sentiment document vector space.

It may be possible to iterate through the group of historical documents for another threshold for the same extrinsic metric (step 516) by selecting another threshold for the group of documents (step 502). Using the example above, a second threshold for sales volume might be selected that is indicative of negative sentiment polarity, and a second standardized sentiment binding phrase used for those action documents, such as LowSales. In any case, the process iterates though the group of documents until each document is checked for negative sentiment. A second frequency term-by-document matrix A, a term dictionary; an action weighted term dictionary and weighted term dictionary are constructed for the newly identified action documents associated with the new sentiment threshold, as well as the other matrices and vectors mentioned above. This new matrix will define action areas for both sentiment polarities, see for example Price_Went_Up and Price_Went_Down action areas in the diagram depicted in FIG. 3. Because each standardized sentiment binding phrase will defined a separate and unique action area in the historical sentiment document vector space, two separate singular sentiment vectors will represent the respective action areas. Moreover, in many instances, what is desired is a means for identifying any potentially actionable documents from those that are clearly not actionable based on sentiment toward the topic, so that only the action documents need be manually reviewed. In those situations, the number of extrinsic metrics tracked or sentiment thresholds associated with each extrinsic metric is relatively unimportant, the prime concern is actionability. It may be beneficial to categorize sentiment form various perspectives for a comprehensive handle on actionability.

The group of historical documents is traversed for still another threshold, but for a second extrinsic metric (step 518), to assess the sentiment using the new sentiment threshold for the second extrinsic metric (step 516). A value for the new sentiment threshold is selected for the new extrinsic metric (step 502) and the process iterates through steps 504 and 512 until the sentiment of all of the documents have been assessed using the new extrinsic metric. Here again, a new extrinsic metric and threshold is semantically represented in the action documents with a new standardized sentiment binding phrase and a completely new frequency term-by-document matrix A may be constructed from all three standardized sentiment binding phrases and the two extrinsic metrics, with three separate and unique singular sentiment vectors. Using again the example of a consumer product, the new extrinsic metric might be user hits on the corporate website that indicate a heightened consumer sentiment toward the product (the topic). In that case, the standardized sentiment binding phrase might be Web_Hits. The use of a second extrinsic metric and a third sentiment threshold for assessing the sentiment of a group of documents toward a topic is diagrammatically represented by the action area Volume_Went_Up in the diagram depicted in FIG. 3. It may also be possible to bind a document with several sentiment binding labels. Thus, using discrete sentiment scoring, a document may contain sentiment binding labels for several extrinsic metrics, for example Stock_Went_Up and Volume_Went_Up, or Stock_Went_Down and Volume_Went_Down.

FIG. 6 is a flowchart depicting a method for constructing historical document sentiment vector space across a range of sentiments by using a graduated sentiment scale in accordance with an exemplary embodiment of the present invention. The process depicted herein may be used with essentially any extrinsic metric, so long as the change in values of the metric infers readers' sentiment toward a topic. The value of an extrinsic metric changes with sentiment polarity and sentiment thresholds can be associated with a metric value between sentiment polarities, or actionable values. For example, positive sentiment polarity for sales of a product might be X units, so if sales are below X, the sentiment polarity is not positive, however sales of less than 0.5 X units are indicative of a negative sentiment polarity toward the product. Hence, the sentiment threshold might yield the following: negative_sentiment<0.5 X≦neutralsentiment≦X<positive_sentiment. Once the documents are labeled, sentimentality threshold can no longer be altered without reprocessing every document in the entire group of documents. The present method avoids much of this reprocessing for cases where the original sentiment thresholds need altering for more accurate sentiment results.

The process begins by mapping a plurality of sentiment scores to values of the selected extrinsic metric for the topic (step 602). For example, sales volumes may be subdivided into twenty-one subdivisions of 0.05 X units for each 0.1 sentiment division, where 0.00 X units maps to a sentiment score of −1.0, 0.05 X units maps to a sentiment score of 0.9, ... 0.95 X units maps to a sentiment score of 0.9, and 1.0, 1.0 X units maps to a sentiment score of 1.0. Next, the group of documents is traversed with the process (step 604), and changes in the value of the extrinsic metric is monitored over timeframe T_w proximate to PD for the current document. The graduated sentiment score for the value is derived from the sentiment/value maps constructed at step 602 (step 608) and the current document is bound with a standardized sentiment binding phrase indicative of the graduated sentiment score (step 610), for example sentiment_value_0.0, sentiment_value_0.5, or sentiment_score_0.9. Using this methodology, all d documents in the group of historical documents will receive an additional unique standardized sentiment binding phrase indicative of the sentiment/value mapping. The process iterates through step 604 and 610 until all of the documents are labeled (step 604). At that point, the sentiment polarity thresholds are assigned from the standardized sentiment binding phrases in the documents (step 612). For example, if it is desired to represent a positive sentiment polarity from all documents having a sentiment score 0.7 and above, the group of documents is queried for standardized sentiment binding phrases of sentiment_score_0.70, sentiment_score_0.80, sentiment_score_0.90, and sentiment_score_1.00. All documents containing any of those four standardized sentiment binding phrases are considered actionable and used to construct the historical sentiment document vector space. Hence, the group of documents, including those identified as action documents, is processed into a historical sentiment document vector space as discussed above. At any time thereafter, should it be desired to change the sentiment thresholds for the sentiment polarity (-ies), the process merely invokes steps 612 and 614, rather than reanalyzing the entire group of documents.

Figure 7:
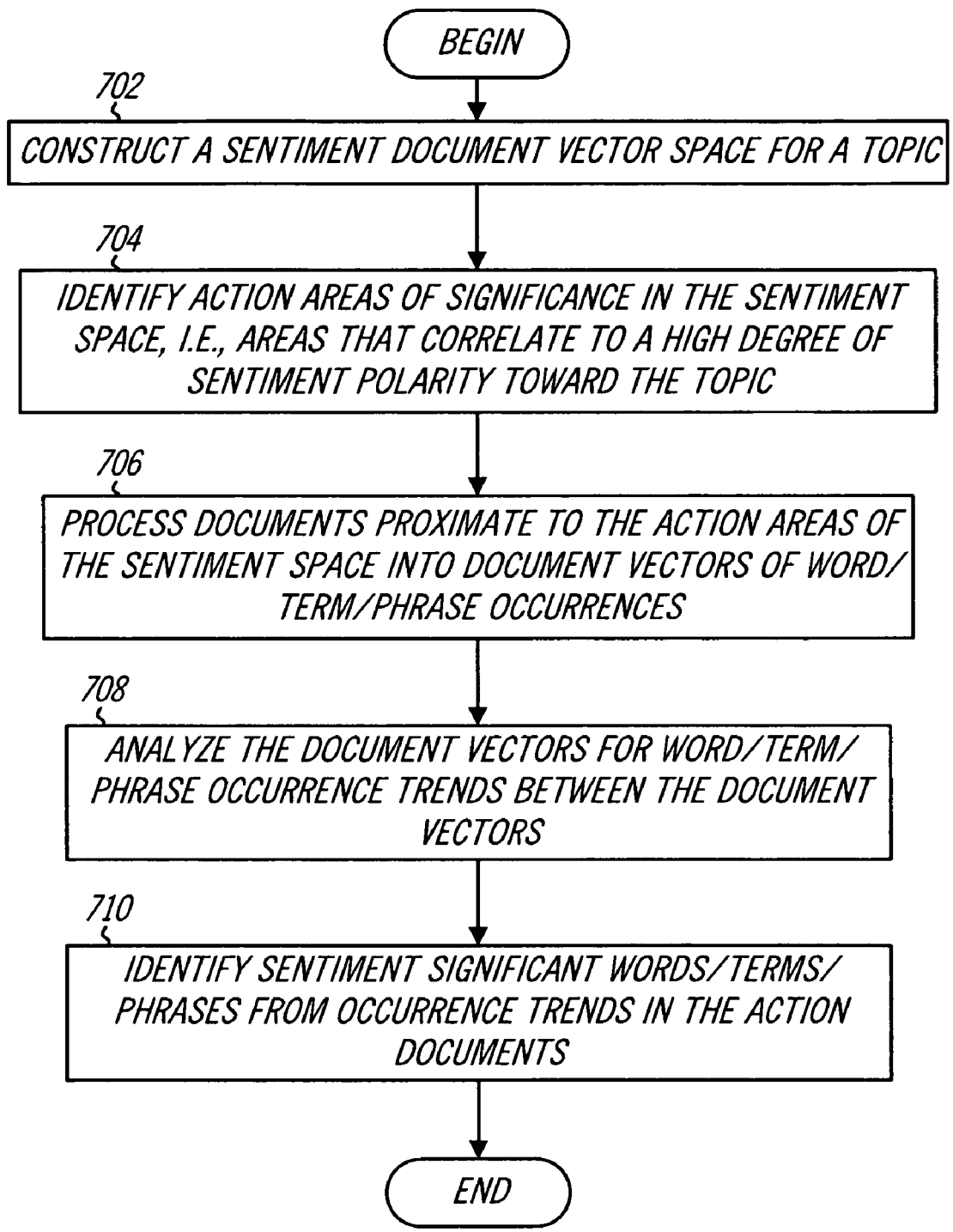
FIG. 7 is a flowchart depicting a method for analyzing the sentiment of terms, words and phrases that occur in the action documents of a historical document sentiment vector space for sentimental significance in accordance with an exemplary embodiment of the present invention.

With the construction of the historical sentiment document vector space, it is possible to analyze the significance of historical sentiment through a semantic analysis of the terms occurring in the action documents, as well as the frequency of occurrence, frequency of co-occurrences in multiple action documents and the ratio of frequencies of co-occurrences in action documents to the co-occurrences in non-action documents (summarized in step 404 of FIG. 4). FIG. 7 is a flowchart depicting a method for analyzing the sentiment of terms, words and phrases that occur in the action documents of a historical document sentiment vector space for sentimental significance in accordance with an exemplary embodiment of the present invention. The process begins with the construction of a historical sentiment document vector space as discussed above with regard to FIGS. 1, 2, 5 and 6 (step 702). Next, action areas of the historical sentiment document vector space are identified that correlate to a heightened sentimental significance toward the topic (step 704). One exemplary means for identifying action areas is by constructing a singular sentiment vector for the historical sentiment document vector space. Its position and orientation in the historical sentiment document vector space will define the action area of the space. Moreover, this singular sentiment vector contains useful information concerning term occurrence and co-occurrences in the action documents. In addition to the singular sentiment vector, the document vectors representing all of the action documents are analyzed for the occurrence, frequency of occurrence and co-occurrences of terms, words and phrases in the action historical documents (step 706). As a practical matter, much of this processing may have been completed beforehand by the construction of the term-by-document Matrix A. What is sought is the identity of words, terms and phrases that: 1) occur in an action document; 2) occur at a high frequency in an action document; 3) co-occur in a plurality of action documents; 4) co-occur at a high frequency in a plurality of action documents; 5) co-occur in a plurality of action documents and occur at a low frequency in non-action documents; and 5) have a high ratio of frequencies of co-occurrences in action documents to co-occurrences in non-action documents (step 710). As may be appreciated from the discussion above, this sentiment analysis of the present invention relies entirely on the frequency of occurrences of terms in the documents and not on the meanings of the individual words in the historical documents. Therefore, words with no sentimental meanings whatsoever, but that have a high frequency of co-occurrences in action historical documents, may be inferred as having a hidden or latent sentimental significance. For example, in action documents concerning the topic of an equity, terms such as "high earning," "met expectations" or "outperformed the market" all have a positive sentimental polarity. However, other terms, for example such as "intuitional buyers" have no such overt sentimental meaning. However, that term may occur with much higher frequency in conjunction with actionable movement of the extrinsic metric, and hence in action documents. In that case, the term "intuitional buyers" may have hidden sentimental significance toward the topic.

Through a sentiment analysis of different historical groups of documents, the sentimental significance of terms toward a topic may be observed to wax and wane over time, some terms gaining sentimental significance while others losing sentimental significance toward the topic. Of particular interest in this regard is words and terms that have some significance or relevance to a competitor or rival for the topic. In these situations, it may be beneficial to organize groups of historical documents to coincide with business cycles, campaigns, product versions, etc., that vary over time. For example, on the topic of a consumer product, the mention of a rival's competing product may have a negative sentiment polarity or a positive sentiment polarity toward the topic of the consumer product depending on the readers' sentiment toward the competing product. If, for example, the competing product is not well received by the public, the mention of that competing product in historical documents for the topic product may coincide with increases in the value of the extrinsic metric, e.g., increased sales of the consumer good. Alternatively, if the competing product is very well received and the topic consumer good is struggling against the competition, then the mention of that competing product in a historical document may coincide with a sales decline of the consumer good.

Other words and terms that may be understood to exhibit significant sentiment using this analysis, may have even a more tenuous significance to the topic. For instance, recently exceptional sales of the iPhone cell phone (a registered trademark of and available from Apple, Inc of Cupertino, Calif.) have resulted in the term "iPhone" having significant sentiment on the topic of wireless carriers, specifically the AT&T Corporation of Delaware which is the sole wireless provider for the iPhone cell phone. As might be expected, an analysis of the historical documents on the topic of AT&T with a positive sentiment polarity have a high frequency of co-occurrences of the term "iPhone," hence the term exhibits a significantly positive sentiment polarity toward the topic of AT&T. In this context, the term "iPhone" has a hidden or latent sentiment meaning toward the topic of AT&T. Conversely, an analysis of action documents on the topic of the wireless provider competitors of AT&T also shows a high frequency of occurrence and co-occurrences of the term "iPhone," however in action documents with a negative sentiment polarity toward the topic, rather than a positive sentiment polarity as in the example for the topic AT&T. Hence, the inclusion of the term in historical documents has a significantly negative sentiment polarity. Reader sentiment toward the terms is so high that even terms related to "iPhone" confer some sentimental meaning to the document, for instance the terms "iPod," "Apple" and "Apple Store" all have gained significant negative sentiment polarity when used in historical documents on the topic of the wireless provider competitors of AT&T, even though these terms are not overtly related to the wireless industry in any way.

Another particularly useful sentiment analysis tool is using the historical sentiment document vector space to identify action historical documents that are particularly relevant to an inquiry. In its basic form, it is possible to create a query string that returns only action historical documents from the historical sentiment document vector space that contain a specific term, word or phrase. For example, the query string <eds AND Stock_Went_Up AND "defense department"> will return all action documents having a positive sentiment polarity and contain the terms "defense department" and EDS for the topic of the equity EDS. Those documents may be analyzed further for sentimental and other meanings.

Figure 8:
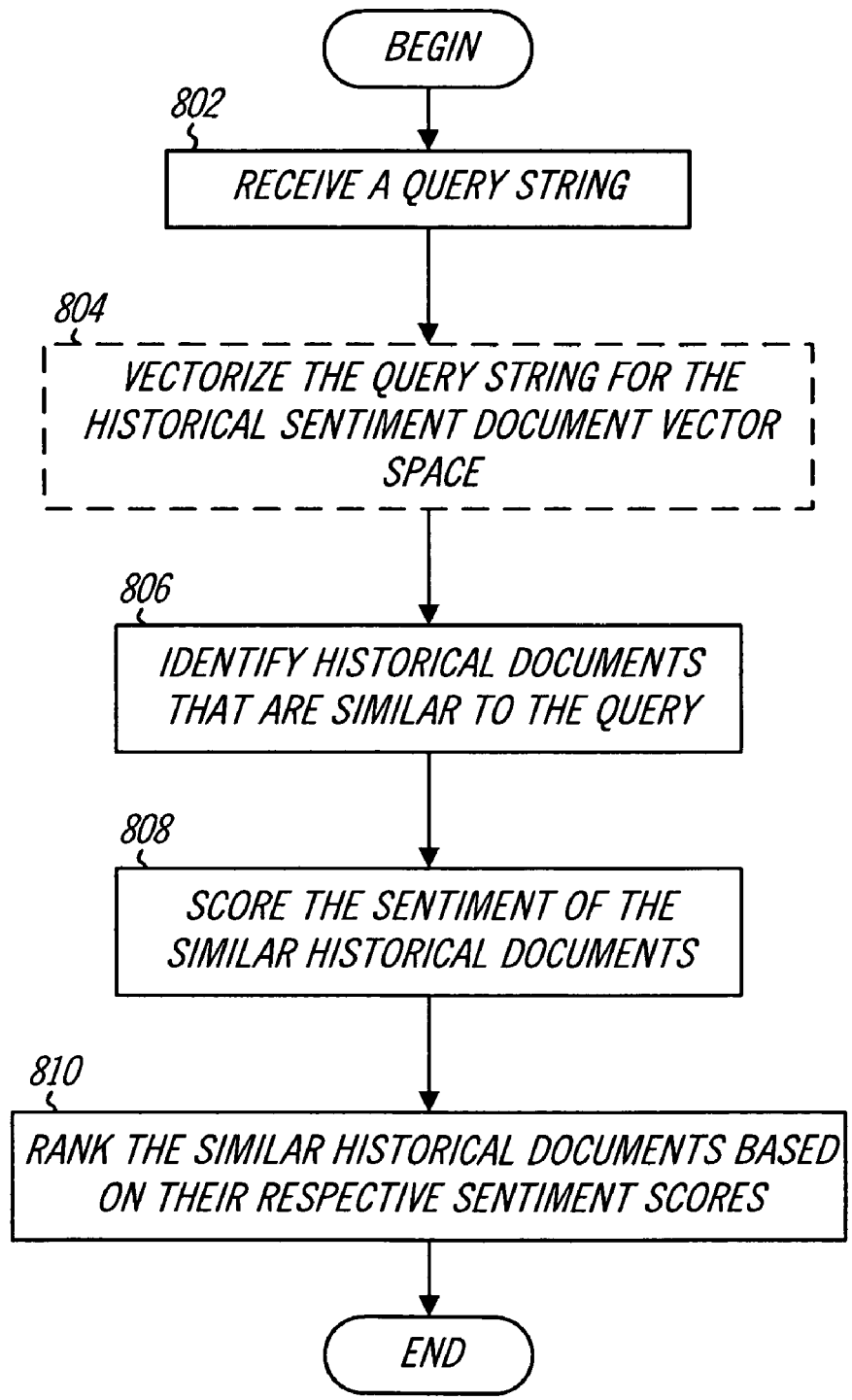
FIG. 8 is a flowchart depicting a method for querying a historical document sentiment vector space for a ranked set of historical documents in accordance with an exemplary embodiment of the present invention.

The shortcoming of this query is that all action documents that are returned have essentially an equal rank and there may be a huge set of returned documents. FIG. 8 is a flowchart depicting a method for querying a historical document sentiment vector space for a ranked set of historical documents in accordance with an exemplary embodiment of the present invention. This method is summarized in step 406 of FIG. 4. Importantly, the rank of the returned documents may have either or both of two components, a semantic similarity score to the query string and/or a sentiment score. The process begins with a query string (step 802). The query string may consist of a term, word, phrase or even an entire document. It may contain standardized sentiment binding phrases, terms with latent sentimental meanings, topics or subject matters, tags or keyword labels used to identify content within the historical documents or other documents or used to summarize historical documents or other documents.

Next, historical documents are identified from the historical sentiment document vector space that are most similar, or relevant to the query, i.e., has co-occurring terms or a high frequency of co-occurrences between the query and historical document. Similarity may be measured by making a semantic comparison of the query string to the historical documents. The term-by-document Matrix A for the document sentiment vector space can be used to form a representative query vector for query string (step 804) and that vector can be semantically compared to the action historical documents for identifying similar documents in the sentiment space (step 806). A similarity score may be obtained using, for example, the dot product method for the vectors and that score used for sorting the historical documents by relevance.

Sentiment scoring may take one of two prevalent forms. In the first, the action documents are awarded one discrete score, say 1.0, and non-action documents have a lower score, 0.0 (see FIG. 5). The second is more complicated and involves historical documents that have been scored using incremental sentiment scoring (see FIG. 6). In either case, the historical documents each have a sentiment binding-phrase that is indicative of its sentiment score (step 808). It is, therefore, possible to score all of the historical documents by semantic similarity to the query (the similarity component) and its sentiment score (the sentiment component). These scores are then compiled into a single score (using the sum, product or a more complicated algorithm), from which the historical documents can be ranked against one another (step 810). It is expected that in most cases the historical documents with contain only a discrete sentiment score, i.e., action document or non-action document, and, therefore, step 808 may be omitted.

One subcategory of the query method discussed above is querying the historical sentiment document vector space using another document. In so doing, the sentimentality of the other document can be readily ascertained by one of two means: the position of its representation document vector in the historical sentiment document vector space; and/or the similarity of the document's representation document vector to representative document vectors for the action documents in the vector space. This method is summarized in step 408 of FIG. 4. As discussed elsewhere above, one deficiency of using an extrinsic metric for measuring the sentiment of a document is that the timeframe T_w for measuring the value of the metric should elapse prior to obtaining an accurate assessment of sentimentality. Thus, finding the sentiment of a recently published documents requires a lag time essentially equivalent to T_w. However, the sentimentality of newly published (referred to internally as contemporaneous publications) can be forecast from the historical sentiment document vector space for the topic by determining a semantic relationship between a representative vector for the contemporaneous publication and the document sentiment vector space. That is, by determining the position of the representative vector for the contemporaneous publication in the historical sentiment document vector space. Similarity can be scored as discussed above, which is effectively an objective indication of the publication's sentiment based on a historical understanding of sentiment toward the topic. Although an objective sentiment score is considered superior to a subjective sentiment scoring of the document, a subjective sentiment score may provide valuable insight to a cumulative sentiment impression of a document.

Figure 9:
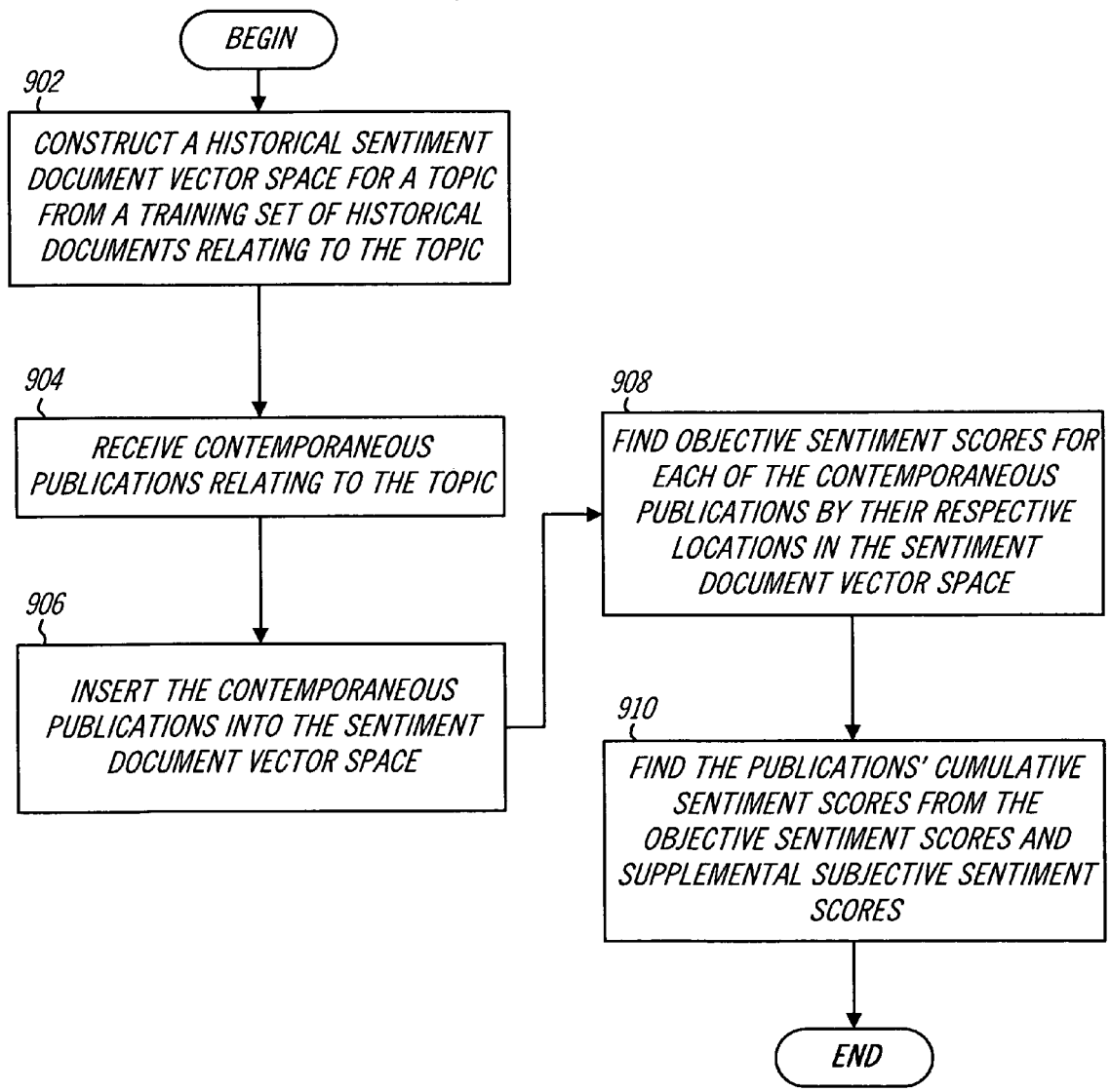
FIG. 9 is a flowchart depicting a high level method for determining a cumulative sentiment score for contemporaneous publications using objective sentiment component derived from a historical document sentiment vector space and a subjective sentiment component in accordance with an exemplary embodiment of the present invention.

FIG. 9 is a flowchart depicting a high level method for determining a cumulative sentiment score for contemporaneous publications using objective sentiment component derived from a historical document sentiment vector space and a subjective sentiment component in accordance with an exemplary embodiment of the present invention. It is expected that at any one time the quantity of contemporaneous publications to be manually reviewed by a user is quite high, sentiment scoring provides a means for prioritizing those publications. Ideally, the sentiment scored contemporaneous publications can be presented to the user in sentiment-ranked form with the most sentimentally significant publications ranked higher. The process begins by constructing a historical sentiment document vector space for a topic (step 902). Typically, the historical sentiment document vector space is in existence beforehand. Next, one or more contemporaneous publications are received that relate to the topic of the historical sentiment document vector space (step 904). Representative vectors for the contemporaneous publication are constructed and inserted into the historical sentiment document vector space (step 906). Essentially, what is sought is a semantic comparison to singular sentiment vector for the historical sentiment document vector space that can be represented as a similarity score (using, for instance, the dot product scoring method for finding the similarity of vectors). This score represents the objective sentimentality of the contemporaneous publications (or more correctly, an objective sentiment forecast using a semantic comparison to historical sentiment information). That sentiment score may be supplemented with other, less reliable or accurate subjective sentiment information (step 908). In the case of the contemporaneous publications, although their sentiments cannot be ascertained from their influence on the extrinsic metric for the topic, other metrics may be available for ascertaining the sentimental significance of the contemporaneous publications, such as the opinions of the readers. In accordance with aspects of exemplary embodiments of the present invention, reliance on and the accuracy of the subjective sentiment assessments can be increased by following three rules: make opinion polling uncomplicated for the reader; provide a multitude of disparate opinion determining mechanism available to the readers; and track results to identify input from reliable readers. Some exemplary methods include monitoring the number of and frequency of posts mentioning the contemporaneous publication, keyword tags used to describe the contemporaneous publication and using reader sentiment barometers enabling a reader to immediately sentiment score a contemporaneous publication. In any case, the subjective sentiment scores are compiled using a biasing algorithm based on relevance and/or trustworthiness, which is then included with the objective sentiment score (step 910). The objective and subjective scores are also compiled using some blending algorithm, heavily weighted in favor of the objective sentiment scoring component. The higher the sentiment score, the more actionable the contemporaneous publication.

There is essentially no direct relationship between the sentiment rank of a contemporaneous publication and its sentiment score, or to the historical sentiment scores for the historical documents used to assess its score. Its rank is derived from a comparison of its cumulative sentiment score to cumulative sentiment scores of all other contemporaneous publications returned from the query. Therefore, the rank of a contemporaneous publication among other documents depends on the sentiment scores of those other documents. It is all but certain that the rank is dynamic and will change with the addition and deletion of contemporaneous publication with each query, even for an identical query string. Furthermore, the cumulative sentiment score is itself a dynamic number that changes over time.

One limitation with sentiment scoring is that sentiment is fleeting. What is sought from a query is a ranked set of actionable contemporaneous publications that can be manually reviewed for their importance to a user. However, because the actionability declines over time with sentiment, at some point an actionable publication becomes non-actionable and need not considered for review by the user. The "freshness" factor for the contemporaneous publications varies with the topic, but is interrelated to the concept of a timeframe of influence T_w used for assessing the historical sentiment score of the historical documents for that topic. Therefore, a significant consideration in assessing the actionability of a contemporaneous publication, and therefore its sentiment rank, is its age. Typically, the actionability of a contemporaneous publication begins high and remains relatively fixed over a short period from its publication date, but declines rapidly thereafter. The rate of actionability decay decreases substantially in the latter extent of its life. As a rule, the actionability of a contemporaneous publication is effectively nil at (PD+T_w). Therefore, this decay in the publication's actionability should be reflected in or applied to the cumulative sentiment score of a contemporaneous publication. Once scored, the fresher contemporaneous publication are retained in a database for access, while stale documents are discarded, hence the contemporaneous publication database is a dynamic database.

Figure 10:
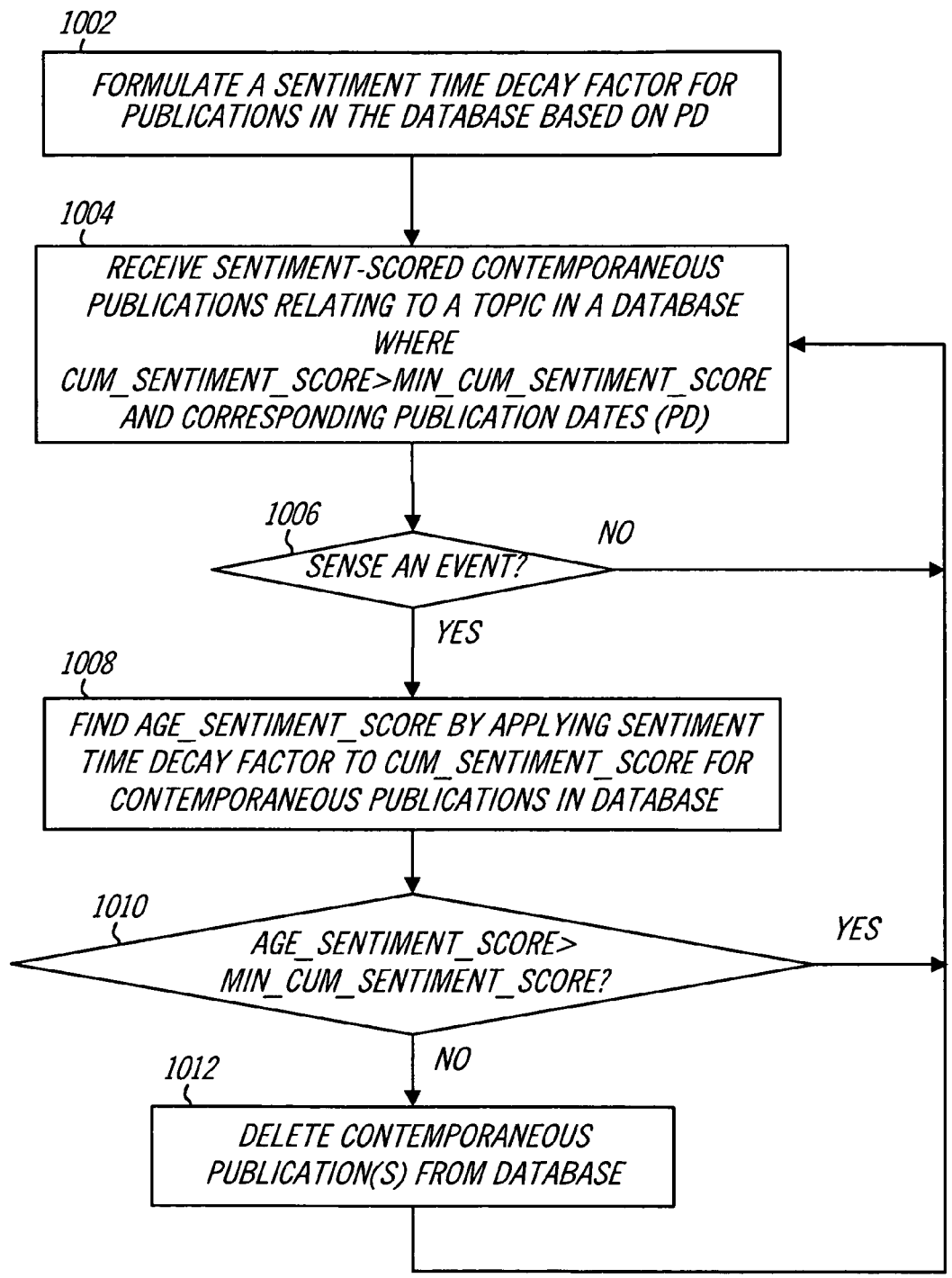
FIG. 10 is a flowchart depicting a method for constructing a dynamic database of sentiment scored contemporaneous publications in accordance with an exemplary embodiment of the present invention.

FIG. 10 is a flowchart depicting a method for constructing a dynamic database of sentiment scored contemporaneous publications in accordance with an exemplary embodiment of the present invention. Optimally, the database of contemporaneous publications stores only actionable contemporaneous publications, and, therefore, each of the cumulative sentiments scores for contemporaneous publications in the database should be above a predetermined minimum sentiment score, that is above a minimum cumulative sentiment score. The cumulative sentiment score for a contemporaneous publication includes at least the objective sentiment score for the publication, but may also include the subjective sentiment scoring component, reduced by a sentiment time decay factor.

It is expected that the sentimentality of a historical document will exhibit only a limited timeframe of influence on the underlying extrinsic metric and, therefore, it can reasonably be assumed that a contemporaneous publication will have a similar timeframe of influence, e.g., approximately equal to T_w. This decay is referred to as sentiment time decay factor and is applied to the cumulative sentiment score of a publication. It is expected that in most cases the sentimentality of a historical document will have the greatest influence on the underlying extrinsic metric proximate to its publication time, hence the sentiment time decay factor will be correspondingly high during that time period. Thereafter, the magnitude of its influence on the metric diminishes substantially until, at the expiration of the timeframe, it exerts no measurable influence on the metric. The character of the sentiment time decay factor may be a linear degradation from the publication time until the expiration of the timeframe, but as a practical matter the magnitude of influence is generally non-linear bell shape or may begin at a near maximum value for a time period and then decrease as an exponential decay. With reference to the contemporaneous publications in the dynamic database, the sentiment time decay factor is applied to the cumulative sentiment score at each event and the age-degraded sentiment score is compared to the minimum sentiment score. Publication will reside in the dynamic database only for the period that the age-degraded sentiment score exceeds the minimum sentiment score.

Returning to FIG. 10, the process is an iterative process that begins with the formulation of a sentiment time decay factor for the contemporaneous publications that is based on the publication date PD of the publications (step 1002). Once the sentiment time decay factor has been established, the process iterates continuously provided that new contemporaneous publications are being received into the dynamic database. Next, one or more contemporaneous publications are received with their respective cumulative sentiment scores and publications with cumulative sentiment scores above a predetermined minimum sentiment score are retained in the dynamic database (step 1004). Typically, this database will contain many hundreds to thousands of contemporaneous publications at any time. The process continually tests for events (step 1006). An event is anything that requires access to the actionable contemporaneous publications stored in the dynamic database, such as a user query, a default query or any request for actionable contemporaneous publications, and therefore, actionability should verified by the sentiment scores for the publications. If no event is sensed, the process continually receives and compares sentiment scores for inclusion in the dynamic database. Upon the occurrence of an event, the age-degraded sentiment score is calculated for every contemporaneous publication in the database by applying the sentiment time decay factor to the cumulative sentiment score for each publication (step 1008). The age-degraded sentiment scores are then compared to the minimum cumulative sentiment score for the database and only the actionable publications are retained (those have an age-degraded sentiment score above or equal to the minimum sentiment score) and the process iterates from step 1004. Those contemporaneous publications with an age-degraded sentiment score below the minimum sentiment score are deleted from the dynamic database (step 1012) and the process again iterates back to step 1004. In so doing, the dynamic database of contemporaneous publications holds only those publications that were tested as being actionable, that is having a significant sentimentality toward the topic at publication or the most recent event.

Figure 11:
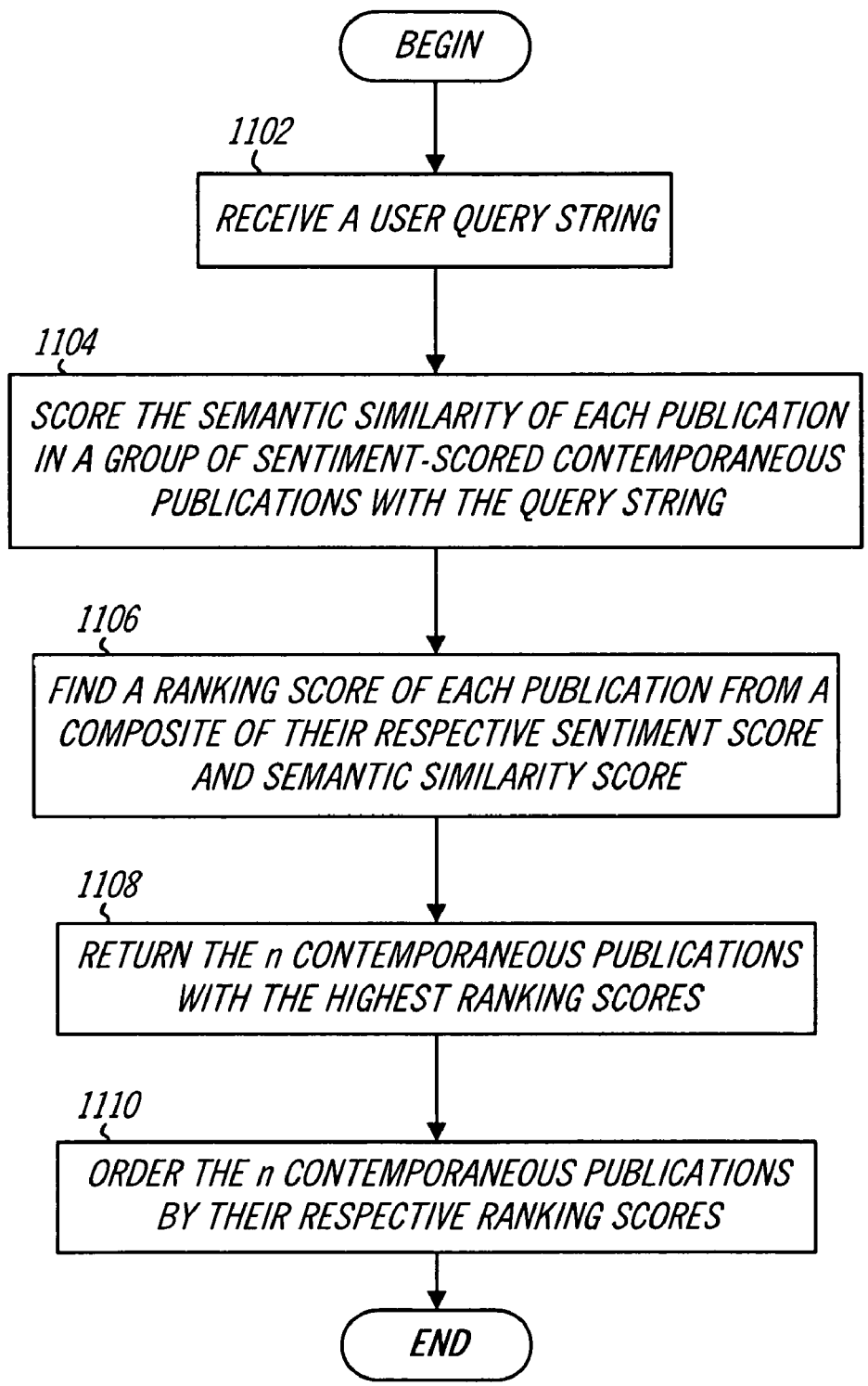
FIG. 11 is a flowchart depicting a method for returning a ranked set of contemporaneous publications from the dynamic database of contemporaneous publications in accordance with an exemplary embodiment of the present invention.

As mentioned, an event, with respect to the dynamic database of contemporaneous publications, is usually the receipt of a query, most often a query issued by a user of the present invention. The user is interested in receiving a sentiment-ranked subset of actionable contemporaneous publications related to the topic, that are relevant to the query. The dynamic database may hold many thousands of contemporaneous publications at any one time. Optimally, the set of returned publications are ranked by their age-degraded sentiment scores and only the n contemporaneous publications with the highest n scores are returned. FIG. 11 is a flowchart depicting a method for returning a ranked set of contemporaneous publications from the dynamic database of contemporaneous publications in accordance with an exemplary embodiment of the present invention. This method is summarized in steps 408, 412, 414 and 416 of FIG. 4. Essentially, the process begins with the construction of the dynamic database of contemporaneous publications as discussed with reference to the method depicted in the flowchart of FIG. 10 above. Because the contemporaneous publications in the database will be continually compared for similarity with users' queries and other queries, it may be helpful to construct a reduced term-by-document matrix for the contemporaneous publications, along with the weighted term dictionary and revise the matrix and dictionary for publications that are newly added and deleted from the dynamic database of contemporaneous publications. In so doing, it is possible to rapidly create representative term-document vectors for the contemporaneous publications that can then be compared to a representative query vector constructed using, for instance, the weighted term dictionary for the dynamic database of contemporaneous publications. Less rigorous search techniques are also possible.

In any case, a query string is received (step 1102), vectorized using the term matrix for the particular semantic document vector space, and that query is compared to each of the contemporaneous publications for semantic similarity using the respective representative document vectors. A semantic similarity score is determined for each contemporaneous publication based on similarity (or relevance) to the query string (step 1104). Recall from the discussion immediately above, at each event, such as a query, the age-adjusted sentiment scores are calculated from the respective cumulative sentiment scores for each of the contemporaneous publications. The age-degraded sentiment scores are used herein and are returned for each of the contemporaneous publications. A ranking score is then compiled from the age-adjusted sentiment score and the query similarity score for each of the contemporaneous publications (step 1106). Next, the n actionable contemporaneous publications with the n highest ranking scores are returned (step 1108) and ordered according to the ranking scores (step 1110). n is any integer value, but is set by the user for the number of actionable contemporaneous publications that the user intends to review for the topic, often ten or fifteen actionable publications will suffice, but several hundred may be returned depending on the depth that the user intends to investigate the topic. Regardless, the present publication ranking methodology ensures that the user is returned the most actionable publications as predicated on the historical sentimentality defined in the historical sentiment document vector space.

Returning to step 1104, in some cases it may be advantageous to semantically compare a representation of query string or query publication to several time iterations of the same semantic document vector space. As mentioned above, over time the documents in the group that populate the semantic document vector space change, resulting in changes in the singular sentiment vector(s) and sentiment binding phrase vectors. Hence, the results of semantic comparisons to a query string will vary correspondingly with changes in the action areas of the semantic document vector space. Since the action areas change over time, the sentimental significance of any query will also change and those changes may be monitored. One particularly useful example of monitoring the dynamic shift in sentiment over time involves the use of two opposing sentiment polarities, such as PriceWentUp and PriceWentDown illustrated in FIG. 3. Changes in the semantic similarity between the query string vector and the PriceWentUp vector and also between the query string vector and the PriceWentDown vector are recorded over time as separate dynamic sentiment scores. Typically, as the sentimentality increases for one binding phrase it decreases for the other. The patterns of increasing and decreasing sentiment cycles can be analyzed against other the semantic document vector space, other documents and real world events for sentimental meaning.

Figure 12:
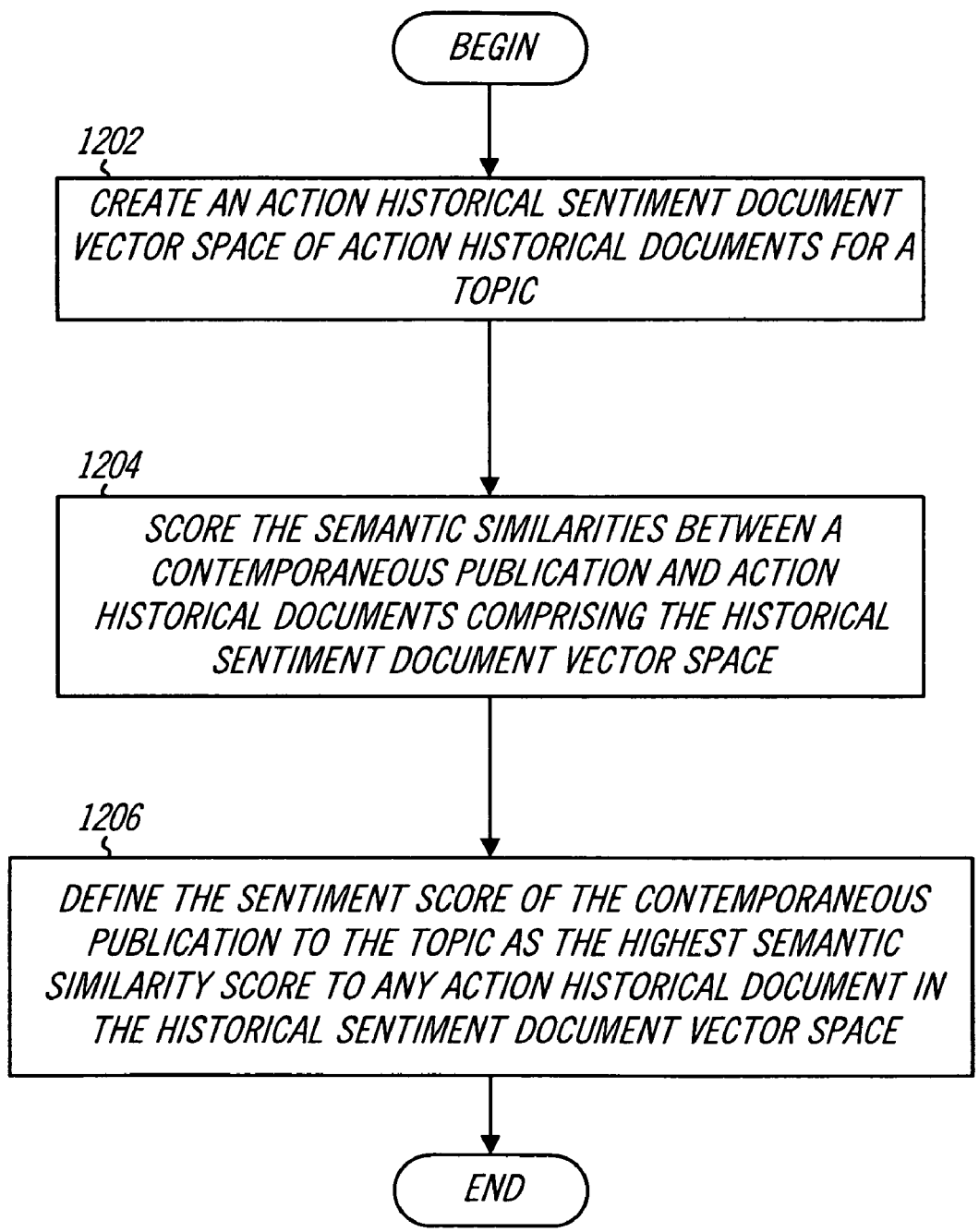
FIG. 12 depicts a flowchart for a scoring method using only action documents for sentiment scoring the contemporaneous publications in accordance with an exemplary embodiment of the present invention.
Figure 13:
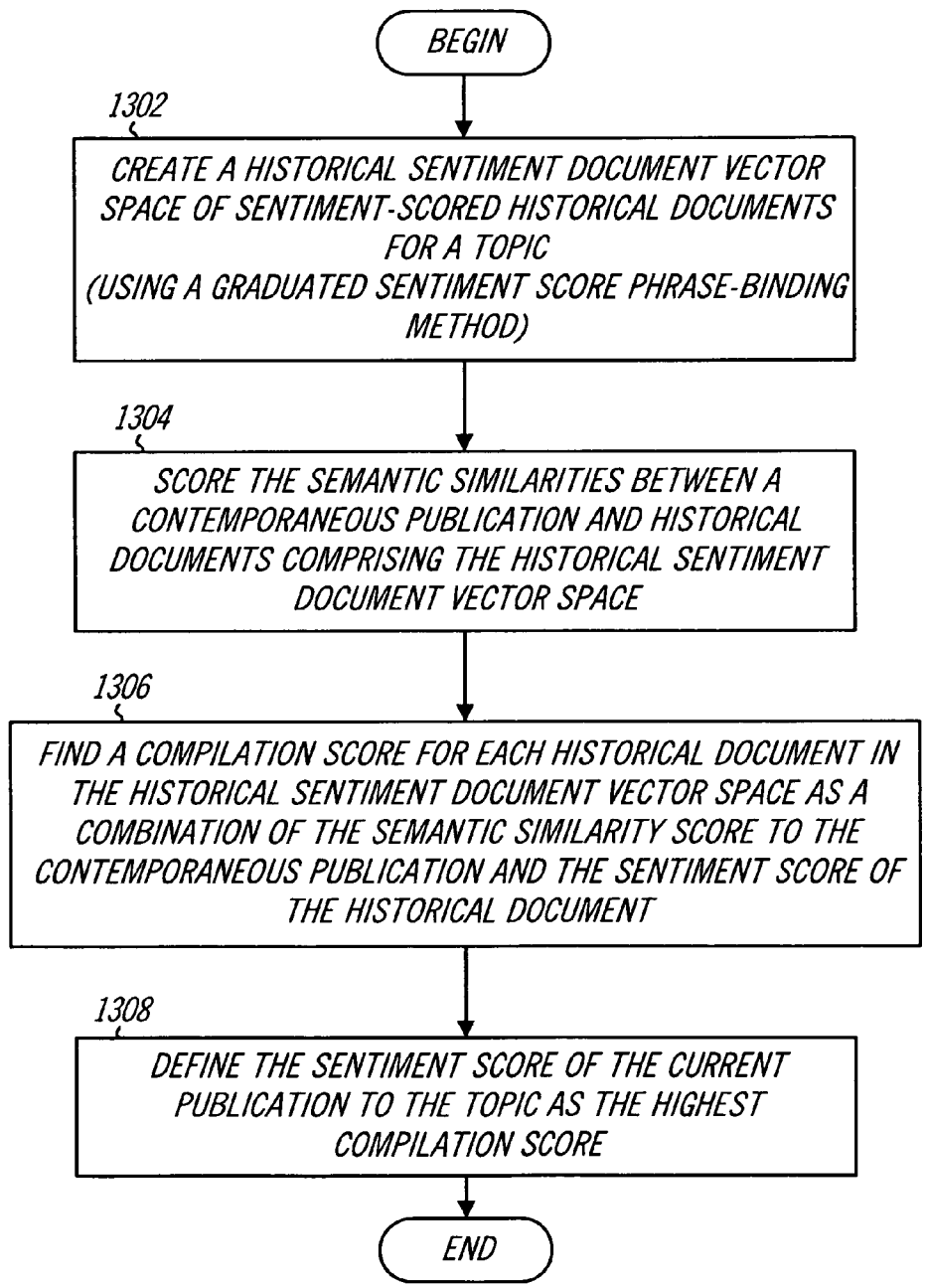
FIG. 13 depicts a flowchart for a second scoring method that utilizes the historical sentiment scores of the historical documents for sentiment scoring the contemporaneous publications in accordance with another exemplary embodiment of the present invention.

Here it should be mentioned, although briefly discussed above, that the cumulative sentiment score of a contemporaneous publication is some compilation of a sentiment score derived from a semantic comparison of the publication to action historical documents in the historical sentiment document vector space (a historical document similarity score) and a historical sentiment score of those action historical documents (a historical sentiment score). As also discussed above, the historical sentiment score of the action historical documents may be derived in one of at least two ways: 1) a discrete sentiment score of action documents, perhaps 1.0 and a lesser score for non-action documents, for instance 0.0 (see FIG. 5); and 2) an incremental or graduated sentiment score, for instance between −1.0 and 1.0 in 0.1 increments (see FIG. 6). Since the sentiment scores of the contemporaneous publications may be based on the sentiment of the action historical documents in the historical sentiment document vector space, it follows that the absolute value of the sentiment score for a contemporaneous publication will depend on the means employed for scoring the action historical documents. FIG. 12 depicts a flowchart for a scoring method using only action documents for sentiment scoring the contemporaneous publications, while FIG. 13 depicts a flowchart for a second scoring method that utilizes the historical sentiment scores of the historical documents for sentiment scoring the contemporaneous publications. The process depicting in FIG. 12 begins with the creation of a historical sentiment document vector space, wherein action historical documents are discretely delineated from non-action historical documents, typically by the inclusion of a standardized sentiment binding phrase in the context of the historical document (step 1202). Next, the semantic similarity between the actions historical documents and a contemporaneous publication is scored, such as by finding the vector dot product for the representative document vectors (step 1204). This similarity score is taken as the sentiment scores for the contemporaneous publication because the sentiment score for the action historical documents is assumed to be the identity, 1.0. The cumulative sentiment score of the contemporaneous publication is defined as the highest semantic similarity score to any of the action historical documents from the historical sentiment document vector space (step 1206). Clearly, this scoring method relies entirely on the divergent similarities to the action documents for sentiment and not on any differences in sentimentality between the action historical documents. As an alternative to finding the most semantically similar action historical document to the contemporaneous publication for realizing the highest semantic similarity, the singular sentiment vector for the action historical vectors and the cumulative sentiment score defined as the similarity score between those document vectors (again, the vector dot product).

The process depicting in FIG. 13 also begins with the construction of a historical sentiment document vector space, however here the degree of sentimentality toward the topic is referenced to a graduated historical sentiment score (step 1302). As discussed above, this incremental historical sentiment score is derived from the initial measurement of sentimentality using the extrinsic metric.

A semantic comparison is made between the contemporaneous publication and each of the action historical documents and a similarity score returned for each of the action historical documents (step 1304). Next, a compilation score is derived from the similarity score and the historical sentiment score for each of the historical documents (step 1306). Unlike the previous method, this score is a compilation of a non-discrete sentiment score for an action historical document and a historical similarity score for that action historical document. The cumulative sentiment score of the contemporaneous publication, using this method, is then defined as the highest compilation score to any of the action historical documents from the historical sentiment document vector space (step 1308). Clearly, this method allows for a higher degree of certainty that the most sentimentally significant contemporaneous publications are returned in response to a query since the sentimentality of the publication is resolved to a much higher degree of certainty.

Figure 14:
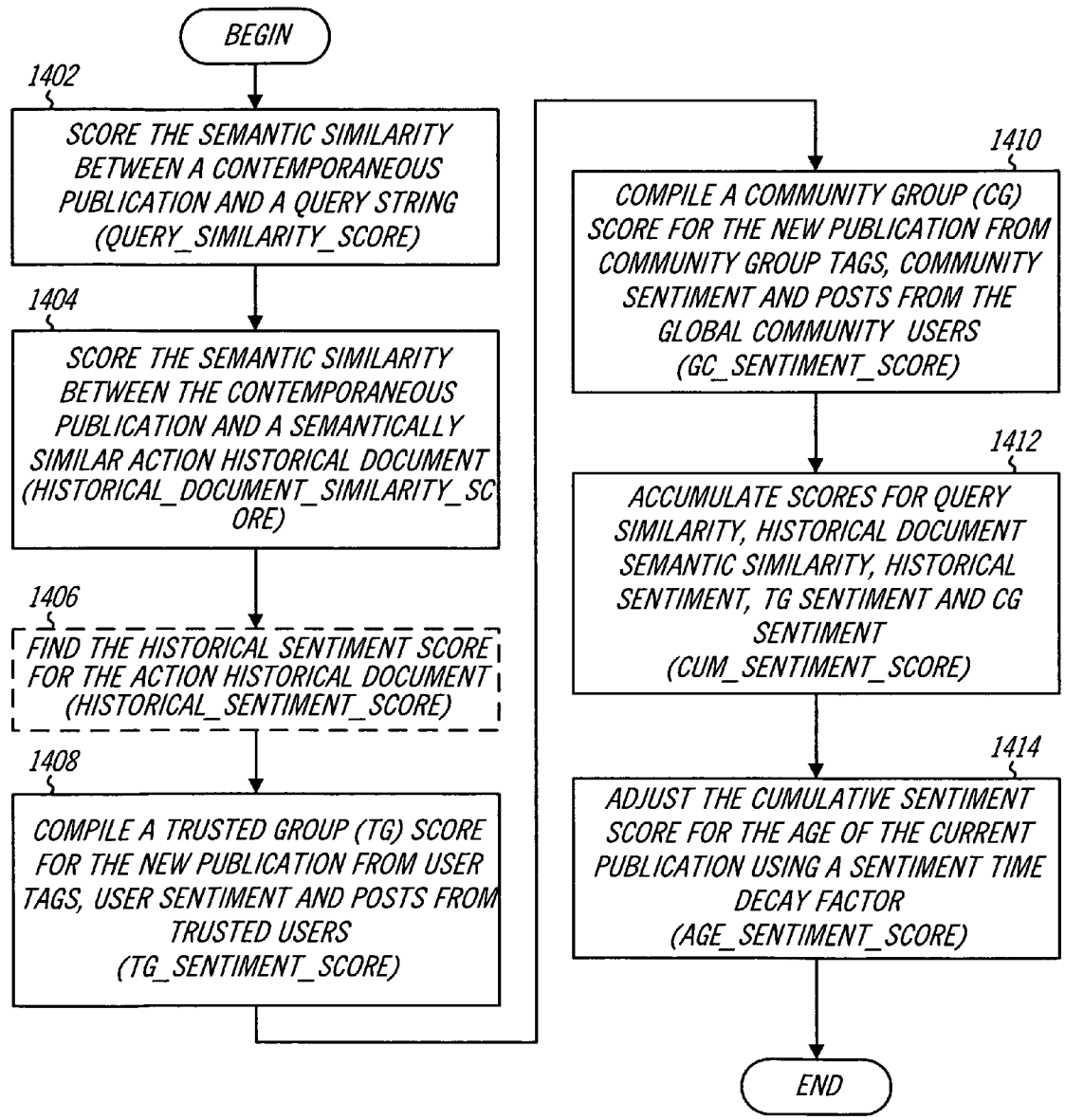
FIG. 14 is a flowchart depicting a method for determining a comprehensive sentiment score for contemporaneous publications in accordance with an exemplary embodiment of the present invention.

In conclusion, the sentiment score for any contemporaneous publication may be a compilation of sentiment inferences and semantic comparisons adjusted for the age of the publication. Optimally, what is desired is an optimal method for selecting only the most actionable publications (those with the highest sentimental significance), at the time the request was initiated; this is referred to as the comprehensive sentiment score for the contemporaneous publication. FIG. 14 is a flowchart depicting a method for determining a comprehensive sentiment score for contemporaneous publications using in accordance with an exemplary embodiment of the present invention. The present method is described for a single contemporaneous publication, which would typically be replicated for each contemporaneous publication in the dynamic database of contemporaneous and then only the highest scoring n contemporaneous publications returned as a sentiment-ranked set. The description of the process assumes that a historical document sentiment database (for defining the historical sentiment document vector space) and dynamic database of contemporaneous publications exist. The process begins with a semantic comparison between the query string and a contemporaneous publication for determining a Query_Similarity_Score (step 1402). Next, a second semantic comparisons is made, this time between the contemporaneous publication and a semantically similar action historical document for the Historical_Document_Similarity_Score (step 1404). Essentially, the highest Historical_Document_Similarity_Score is taken from all of the action documents as the historical sentiment score is assumed to be 1.0. Alternatively, if a Historical_Sentiment_Score is available, then those scores are used (step 1406). These scores provide the basis of the objection component of the sentiment score. Next, the subjective component of the sentiment score is determined. Initially, the Trusted_Group_Sentiment_Score is compiled from group members and user who are trusted for their sentiment assessment concerning the topic (step 1408) (see the discussion of the process depicted by the flowchart of FIG. 16). Next, the Global_Community_Sentiment_Score is compiled from global community members (step 1410). The members of the global community are fall less trustworthy for their assessments of the sentiment for the topic than the trusted group members.

Ultimately, a Cumulative_Sentiment_Score for the contemporaneous publication is accumulated from the query similarity, historical document similarity, historical sentiment, trusted group sentiment and global community sentiment scores (step 1412). Optimally, the scores are combined using a weighted algorithm, giving the highest weight to the most reliable and accurate scores and the lowest weight to the more unreliable and least accurate scores. Finally, an Age_Sentiment_Score is derived from the cumulative sentiment score by adjusting it for the age of the contemporaneous publication using a sentiment time decay factor (step 1414). The age sentiment score is the most comprehensive sentiment assessment for the contemporaneous publication that is possible for that query.

Figure 15:
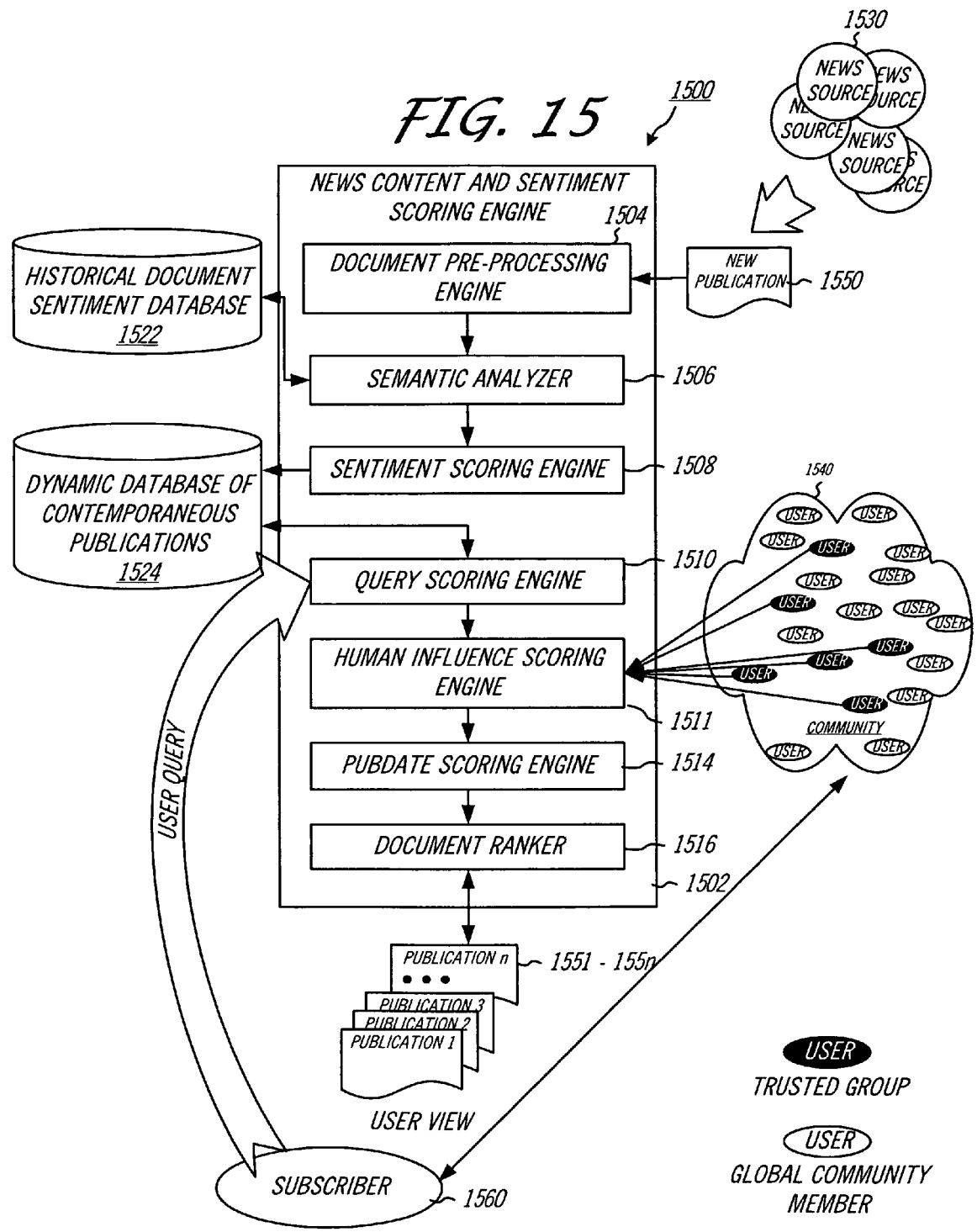
FIG. 15 is a diagram of the logical components of a sentiment-based text classification and relevancy ranking device in accordance with an exemplary embodiment of the present invention.

The present invention may be embodied in one of many devices, mediums and processes. These devices are diagrammatically illustrated by the logical components depicted in FIG. 15. Ideally, the present invention may be envisioned as a document ranking device with three primary components: news content and sentiment scoring engine 1500, historical document sentiment database 1522 and dynamic database of contemporaneous publications 1524. These components operate under the direction of user 1560 and in concert with a variety of news sources 1530 for generating a multitude of contemporaneous publications, represented further in the diagram as new publication 1550, and global community 1540, which is comprised both trusted groups, represented by the darkened symbols, and the global community members, represented by the lighter symbols. User (subscriber) 1560 issues queries to sentiment scoring engine 1500 and receives a plurality of sentiment-ranked publications 1551-155n in return. The processes described by the flowcharts depicted in FIGS. 1, 2, portions of 4, and 5 through 14 are performed by various components of sentiment scoring engine 1500, as will briefly be described below.

Initially, a historical sentiment document vector space is constructed from a training set of historical documents pertaining to a particular topic. The results of that vector sentiment space is compiled in historical document sentiment database 1552, including, but not limited to, any of a frequency term-by-document matrix A; a term dictionary; an action weighted term dictionary; weighted term dictionary; a reduced concept term-by-document matrix A; decomposed reduced concept term-by-concept matrix T (t×k); decomposed reduced concept singular value concepts matrix S (k×k); and the decomposed transpose reduced concept concepts-by-document matrix $D^T$ (k×d), representative document vectors for the action documents; and singular sentiment vector representative of the action area of the historical sentiment document vector space. From time to time new publication 1550 is created by news sources 1530 pertaining to the topic of the historical documents contained in historical document sentiment database 1522. As a practical matter, news sources 1530 generate hundreds or thousands of publications that relate to the topic of historical document sentiment database 1522. In any case, new publication 1550 is received by document pre-processing engine 1504 which reduces and combines the document terms and creates representative document vectors as necessary for semantic comparisons with the action historical documents and/or singular sentiment vector of the historical document sentiment database 1522. Semantic analyzer 1506 makes the semantic comparisons with the action document vectors and/or singular sentiment vector and sentiment scoring engine 1508 derives a sentiment score for new publication 1550. Whether or not it is accepted into space dynamic database of contemporaneous publications 1524 depends on whether or not the publication qualifies as an actionable publication (i.e., its sentiment score is greater than or equal to a minimum sentiment score). Dynamic database of contemporaneous publications 1524 is populated with actionable contemporaneous publications.

User 1560 utilizes sentiment scoring engine 1500 to provide a consolidated list of sentiment ranked publications 1551-155n, rather than perusing through every publication generated by news sources 1530. To that end, user 1560 issues a query for relevant contemporaneous publications. The user query is received at query scoring engine 1510 of sentiment scoring engine 1500, which query scores the contemporaneous publications stored in dynamic database of contemporaneous publications 1524. Next, subjective sentiment scoring is assessed for the contemporaneous publications by human factors scoring engine 1511. Human factors scoring engine 1511 assesses the trusted group's sentiment score, as well as the global community sentiment score, provides weighting as necessary and passes the cumulative sentiment score to pubdate scoring engine 1514. Pubdate scoring engine 1514 applies the sentiment time decay factor to the cumulative sentiment scores for the contemporaneous publications, which are then passed to document ranker 1516, which ranks the contemporaneous publications by their respective age sentiment scores and returns the n most relevant actionable contemporaneous publications to user 1560. Pubdate scoring engine 1514 may also pass the age sentiment scores for the contemporaneous publications to dynamic database of contemporaneous publications 1524 for clearing stale contemporaneous publication from the database, i.e., those with a sentiment score lower than the minimum sentiment score necessary for acceptance into the database. Stale contemporaneous publication may be considered historical documents and used for updating or modifying the document sentiment vector space. Clearly, using the present invention, news content and sentiment are offered as an indicator of the potential value of the actionable publications. These actionable contemporaneous publications represented the most sentimentally significant documents available at the time the query was initiated, and therefore likely contain important information concerning the topic. It is then up to the user to review some or all of the documents for their importance to the topic. Importantly, it is possible that none of the actionable contemporaneous publications returned from the query have much sentimental significance to the topic, however, at the time the query was initiated, these were the most sentimental significant publications in dynamic database of contemporaneous publications 1524.

Figure 16:
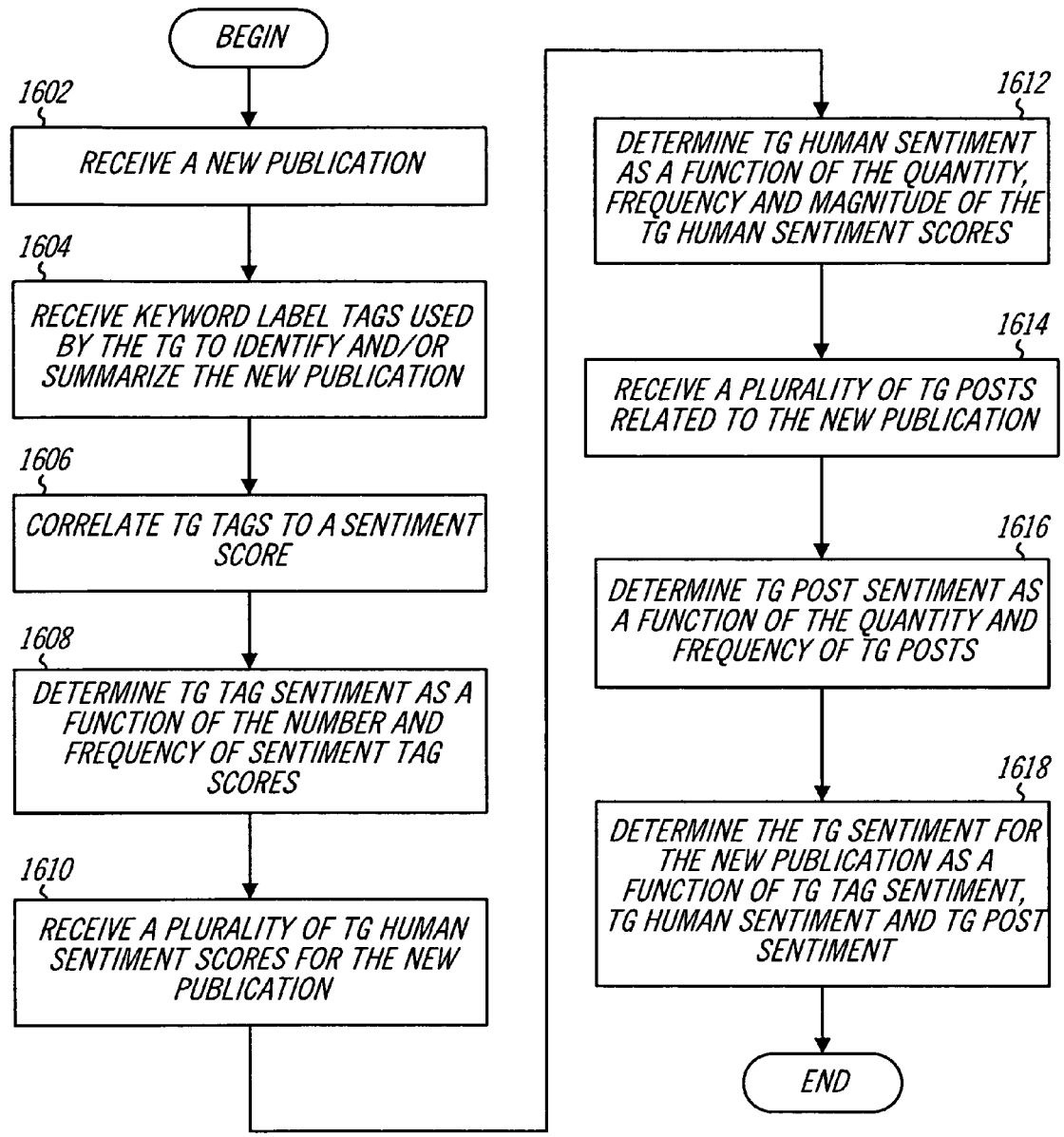
FIG. 16 is a flowchart depicting a method for scoring the sentiment of the trusted group members in accordance with an exemplary embodiment of the present invention.

FIG. 16 is a flowchart depicting a method for scoring the sentiment of the trusted group members in accordance with an exemplary embodiment of the present invention. Members of the global community and groups achieve the status of a trusted group by demonstrating some competence concerning a particular topic. Ideally, a user will identify different groups and individuals as trusted group members for each topic tracked by the user. The sentimentality of a contemporaneous publication toward the topic is defined as a compilation of one or several sentiment scoring mechanisms. Initially, a contemporaneous publication is received by the trusted group (step 1602). The group members use keyword tags and labels to characterize the sentiment toward the topic and/or summarize the publication (step 1604). These keywords and tags are correlated to sentiment scores (step 1606). Essentially, a human inference scoring engine maintains a list of tag to sentiment score mappings that is indexed with a user tag for a sentiment score. Next, the trust group tag sentiment can be measured as a function of the number and frequency of trusted group tag scores (step 1608).

Further, the trusted group can provide human sentiment scores for the publication, perhaps within a predetermined range of sentiment score, e.g. from −1.0 to 1.0 in increments of 0.1 (step 1610). This trusted group's human sentiment can then also be represented as a function of the quantity, frequency and magnitude of the human sentiment scores (step 1612). Finally, posts from trusted group members are received (step 1614) and the sentiment of the posts determined as a function of the quantity and frequency of the posts (step 1616). Here, the mere existence of a high quantity and/or frequency of posts concerning the publication are indicative of sentimental significance, even without understanding the sentimental meaning of the terms in the posts. The trusted group sentiment is then assessed for the publication as a function of the tag sentiment, human sentiment and post sentiment (step 1618).

Figure 17:
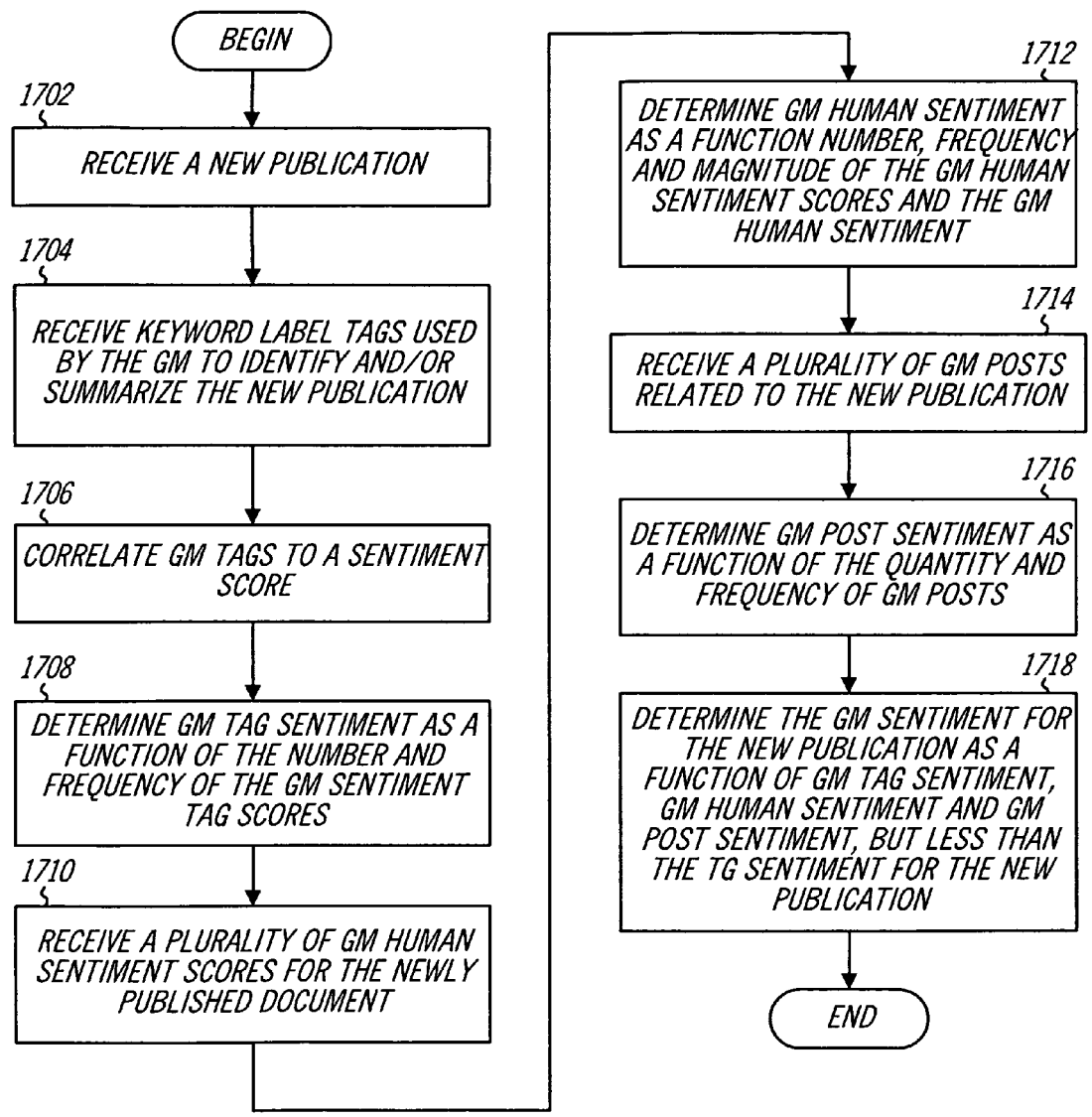
FIG. 17 is a flowchart depicting a method for scoring the sentiment of the global community members in accordance with an exemplary embodiment of the present invention.

FIG. 17 is a flowchart depicting a method for scoring the sentiment of the global community members in accordance with an exemplary embodiment of the present invention. The global community members include everyone who interacts, tags and/or responds to a publication except the trusted group members for the topic. Essentially the process for determining the sentiment for the global community is identical to that of the trusted group, but for the global community members. Initially, a contemporaneous publication is received by the global community members (step 1702). Keyword tags and labels are received (step 1704) and correlated to sentiment scores (step 1706), from which, the sentiment of the global community members to the publication can be measured as a function of the number and frequency of the global community member tag scores (step 1708). Global community member human sentiment scores for the publication are represented alphanumerically, over a range of sentiment scores (step 1710) and the global community member human sentiment is represented as a function of the quantity, frequency and magnitude of the human sentiment scores (step 1712). Posts from global community members are received (step 1714) and the sentiment of the posts determined as a function of the quantity and frequency of the posts (step 1716). Finally, the global community member sentiment is then assessed for the publication as a function of the tag sentiment, human sentiment and post sentiment (step 1718).

User tags and keyword labels attached to a document provide users with a treasure trove of synonymic information concerning a publication. For instance, associated with the set of sentiment-ranked documents returned from a query are tags that summarize and or describe the sentimentality of each of the documents. These tags are a very useful for modifying a query string toward receiving semantically similar documents to the tag. Many of these modifications can be run automatically in the background and presented to the user as an alternative set of sentiment-ranked publications.

Figure 18:
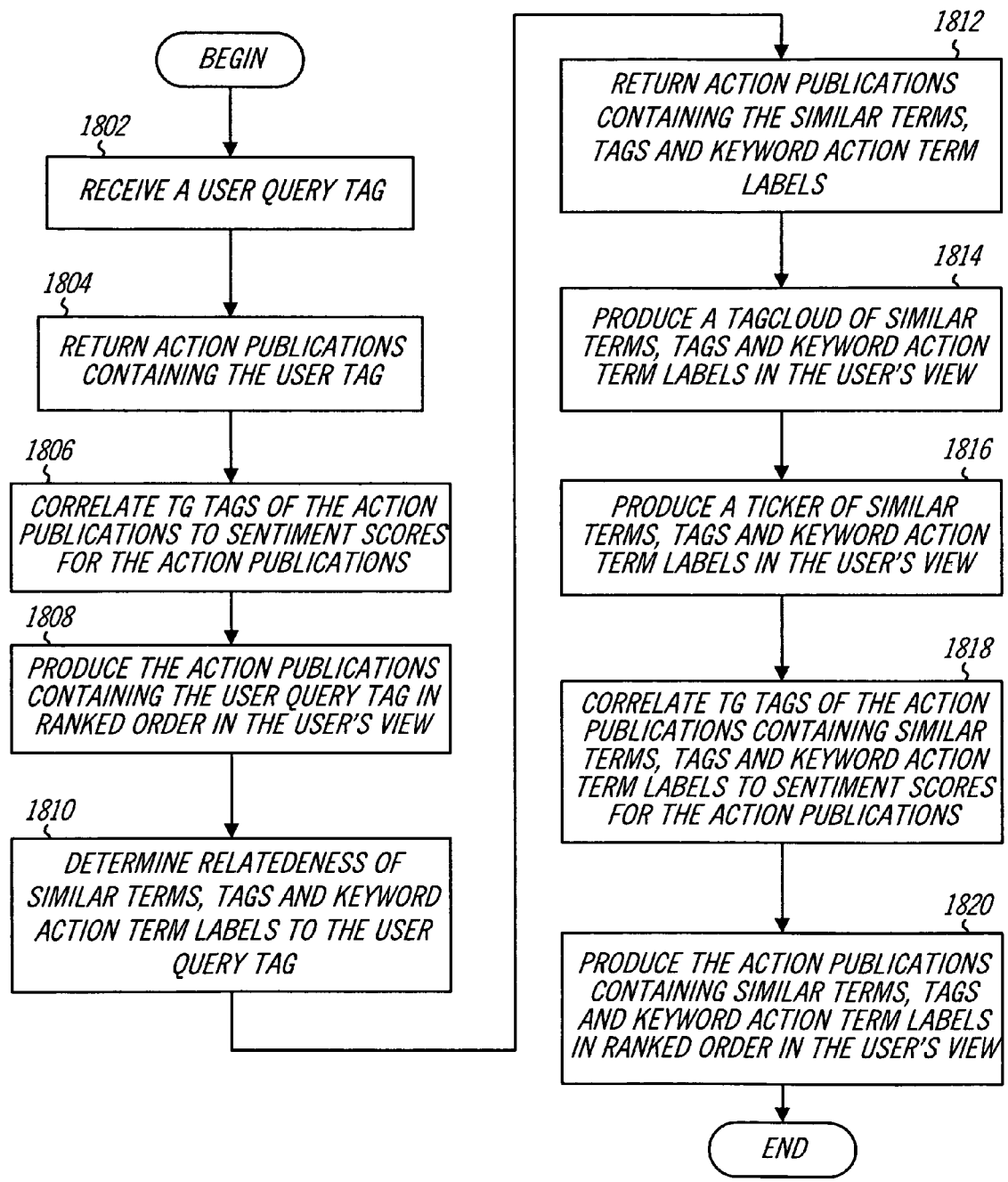
FIG. 18 is a flowchart depicting a method for using tags to optimize a user's experience with sentiment scored publications in accordance with an exemplary embodiment of the present invention.

FIG. 18 is a flowchart depicting a method for using tags to optimize a user's experience with sentiment scored publications in accordance with an exemplary embodiment of the present invention. The process begins with a user issued query string that includes a user defined tag (step 1802) from which a set of sentiment-ranked action publications with user tags returned (step 1804). Accompanying each of the publications in the set of sentiment-ranked action publications is one or more trusted group tags that summarize the publication containing the tag and/or the sentiment of the publication containing the user tag. In accordance with exemplary embodiments of the present invention, while a user can label a publication with a specific tag, that tag can in turn retrieve other publications not only containing that tag, but containing information related to that tag. This measure of relatedness can also be computed by a variety of methods, including statistical and probabilistic similarities, latent semantic models, hyperspace analogs (a specific method of term similarity called hyperspace analog to language), vector space models, etc. In the application, a user is presented with a "ticker"—a scrolling display of tags along with an indication of that tags' increasing or decreasing usage (an up or down arrow). Since the tags can also relate to document meaning, the indications can show not only physical labeling with the tag but also machine-measured similarity to the tag meaning. This procedure can also be used to 'auto-tag' content. For example, an article about the Apple iPhone may or may not be explicitly labeled with the term 'AT&T'. In either case, the term AT&T may appear on the tag ticker and searching for that tag may return that article because of their similarity of meaning. Further, the article may be auto-tagged (or the tag AT&T may be suggested to the user as a possible tag) because the content of the article is related to AT&T.

Returning to FIG. 18, the trusted group tags from the action publications are correlated to the sentiment scores of the respective publications (step 1806), and the publications are then produced to the user in ranked order on the basis of the sentiment scores (step 1808). Next, the relatedness of similar terms, words and keyword labels to the user tag is determined using, for instance statistical and probabilistic similarities, latent semantic models, etc. (step 1810) and additional action publications are returned to the user containing the more related similar terms tags and keyword labels (step 1812). Many of these action publications will not contain the original user tag, but are all related to the document meanings of the original set of action documents returned to the user in step 1804.

Next, a tagcloud of similar terms, tags and keyword labels is presented in the user view (step 1814) as well as a ticker of similar action terms with sentiment indicia, for instance arrows adjacent to the tag infer information concerning the tag's use with the document (step 1816). The documents returned containing similar terms, tags and keyword labels to the user tag, with themselves have trusted group action tags that can be sentiment scored similarly to step 1806. These are sentiment scored (step 1818) and the action publications containing those terms, tags and keyword labels can then be presented in sentiment-ranked order in the user's view (step 1820). Notice from the example above that the user merely defines a document with tags and all action documents containing the tags, as well as all action documents related to the meaning of the original set of ranked action documents are presented in sentiment-ranked order for the user.

Finally, the contemporaneous publications stored in the dynamic database of contemporaneous publications may be analyzed in a manner similar to that discussed for the historical documents in the historical sentiment document vector space discussed with reference to FIG. 7. Importantly, term usage in the contemporaneous publications is not necessarily related to the historical sentiment relationships defined by the historical sentiment document vector space. Some terms gain and lose sentimental significance over time. An analysis of the sentimental significance of these terms may be helpful for, among other things, in identifying new keyword labels and tags for the publications.

FIG. 19 is a flowchart depicting a method for analyzing the sentiment of contemporaneous publications in accordance with an exemplary embodiment of the present invention. This method is summarized in step 410 of FIG. 4. The process begins with the construction historical sentiment document vector space from a training set of historical documents relating to a specific topic (step 1902) and then sentiment scoring a plurality of contemporaneous publications using that historical sentiment document vector space (step 1904). Action publications are then identified from the sentiment scoring (step 1906). The action publications may be semantically processed in a manner similar to the group of historical documents to obtain at least document vectors for term, word and phrase occurrence and co-occurrences in the action publication (step 1908). Optimally, a contemporaneous publication vector sentiment space may be constructed similarly to the historical sentiment document vector space with a singular sentiment vector representative of the action area of the contemporaneous publication vector sentiment space. The sentimental significance of words and terms occurring in the contemporaneous publications can then be assessed by the semantic similarity to a singular sentiment vector representative of the action contemporaneous publications.

In any case, the document vectors representing the action contemporaneous publications can be analyzed for the occurrence of terms and the co-occurrence of terms in multiple action contemporaneous publications (step 1910). Words and terms with sentimental significance can then be identified from occurrence trends in the action publications (step 1912). As mentioned above, the creation of a weighted term dictionary may be useful in identifying co-occurrence trends in multiple action publications.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer implemented method of assessing human sentiment from a group of documents, each document in the group of documents having a plurality of terms and being digitally represented in a computer, the method comprising:
receiving, by the computer, a group of documents, each document in the group of documents comprising a context of a plurality of terms and all documents in the group of documents representative of a particular topic;
constructing, by the computer, a document sentiment vector space from the group of documents, wherein construction of the document sentiment vector space comprises:
assessing sentimentality of each document in the group of documents toward the topic, by the computer, wherein sentimentality represents human emotion toward the topic, comprising:
deriving a publication date for each document in the group of documents;
electing an extrinsic metric for the particular topic for assessing the sentimentality toward the topic, the extrinsic metric being related to an affirmative and intentional human action with a value of the extrinsic metric being indicative of the human action;
receiving extrinsic metric historical data for each document in the group of documents proximate to the respective publication date for each document; and
examining the extrinsic metric historical data for each document proximate to the respective publication date for each document over a timeframe of influence for changes in the value of the extrinsic metric, wherein the timeframe of influence is a predetermined time period in which a context of a document influences humans to undertake an affirmative and intentional human action resulting in a change in the value of the extrinsic metric;
identifying sentimentally significant documents in the group of documents with heightened sentimentality toward the particular topic, by the computer, comprising:
receiving a sentiment value for the change in the extrinsic metric historical data, the sentiment value being indicative of sentimental significance; and
comparing the sentiment value to the changes in the value of the extrinsic metric over the timeframe of influence for each document in the group;
labeling the identified sentimentally significant documents, in the computer, by including a unique sentiment binding term in the context of the plurality of terms;
representing, by the computer, each document in the group of documents in the document sentiment vector space;
defining, by the computer, a region of sentimental significance in the document sentiment vector space based on an occurrence of document representations for the identified sentimentally significant documents with the unique sentiment binding term;
receiving, by the computer, a query string; and
assessing, by the computer, the sentimentality of the query string by comparing a representation of the query string for semantic similarity to the region of sentimental significance in the document sentiment vector space.

2. The method of claim 1, wherein the particular topic is one of a person, occupation, athlete, entertainer, politician, humanitarian, political party, product, film, equity, cause, finance, complaint, patent, sport's team and country.

3. The method of claim 1, wherein the particular topic is an equity and the extrinsic metric is one of selling price, change in the selling price, ratio of the change in the selling price to an average price, sales volume, change in the sales volume and ratio of the change in the sales volume to an average volume.

4. The method of claim 1, wherein constructing, by the computer, the document sentiment vector space from the group of document further comprises:
creating a term-by-document matrix of all terms occurring in the group of documents; and
decomposing the term-by-document matrix into a term-by-concepts matrix and a documents-by-concepts matrix.

5. The method of claim 4, wherein defining the region of sentimental significance in the document sentiment vector space further comprises:
creating a singular sentiment vector from a product of document vectors from the documents-by-concepts matrix representing the identified sentimentally significant documents.

6. The method of claim 4, wherein defining the region of sentimental significance in the document sentiment vector space further comprises:

creating a binding term vector from term vector in the term-by-concepts matrix representing the unique sentiment binding term.

7. The method of claim 4, wherein defining the region of sentimental significance in the document sentiment vector space further comprises:
creating an action document vector for each document vector from the documents-by-concepts matrix representing a sentimentally significant document.

8. The method of claim 7, wherein assessing the sentimentality of the query string, by the computer, by comparing the representation of the query string for semantic similarity to the region of sentimental significance in the document sentiment vector space further comprises:
selecting an action document vector most semantically similar to the query string for assessing the sentimentality of the query string.

9. The method of claim 1, wherein the query string is a term and assessing the sentimentality of the query string by comparing, by the computer, the representation of the query string for semantic similarity to the region of sentimental significance in the document sentiment vector space further comprises:
selecting a query term vector from a term-by-concepts matrix for the query string as the representation of the query string; and
comparing the query term vector for semantic similarity to the region of sentimental significance in the document sentiment vector space.

10. The method of claim 1, wherein the query string is a plurality of terms and assessing the sentimentality of the query string by comparing, by the computer, the representation of the query string for semantic similarity to the region of sentimental significance in the document sentiment vector space further comprises:
creating a query term vector as the representation of the query string for the query string from a vector sum of query term vectors from a term-by-concepts matrix, for each of the plurality of terms occurring in the query string; and
comparing the query term vector for semantic similarity to the region of sentimental significance in the document sentiment vector space.

11. The method of claim 1, wherein the query string is a document having a document publication date and comprises of a plurality of document terms and assessing the sentimentality of the a query string, by the computer, by comparing a representation of the query string for semantic similarity to the region of sentimental significance in the document sentiment vector space further comprises:
creating a query term vector as the representation of the query string for the query string from a vector sum of query term vectors from a term-by-concepts matrix, for each of the plurality of terms co-occurring in the query string and the term-by concepts matrix; and
comparing the query term vector for semantic similarity to the region of sentimental significance in the document sentiment vector space.

12. The method of claim 11, further comprises:
quantizing, by the computer, a sentiment score for the sentimental significance of the query string to the particular topic based on the semantic similarity of the representation of the query string to the region of sentimental significance in the document sentiment vector space, wherein the sentiment score being indicative of the sentimental significance of a contemporaneous publication toward the particular topic.

13. The method of claim 12, wherein the document is a contemporaneous publication representative of the particular topic, the contemporaneous publication having a contemporaneous publication date and comprising a context of a plurality of publication terms, wherein the sentiment score being indicative of the sentimental significance of the contemporaneous publication toward the particular topic.

14. The method of claim 13, further comprises:
receiving, by the computer, a second query string comprising a second contemporaneous publication representative of the particular topic, the second contemporaneous publication having a second contemporaneous publication date and comprising a second context of a second plurality of publication terms;
assessing the sentimentality of the second contemporaneous publication, by the computer, by comparing a representation of the second query string for semantic similarity to the region of sentimental significance in the document sentiment vector space; and
quantizing, by the computer, a second sentiment score for the sentimental significance of the second query string to the particular topic based on the semantic similarity of the representation of the second query string to the region of sentimental significance in the document sentiment vector space, wherein the second sentiment score being indicative of the sentimental significance of the second contemporaneous publication toward the particular topic.

15. The method of claim 14, further comprises:
sentiment ranking, by the computer, the contemporaneous publication and the second contemporaneous publication based on their respective sentiment score and second sentiment score.

16. The method of claim 15, wherein defining the region of sentimental significance in the document sentiment vector space further comprises:
creating a singular sentiment vector from a product of document vectors from the documents-by-concepts matrix representing the identified sentimentally significant documents.

17. The method of claim 15, wherein defining the region of sentimental significance in the document sentiment vector space further comprises:
creating the binding term vector from term vector in the term-by-concepts matrix representing the unique sentiment binding term.

18. The method of claim 15, wherein defining the region of sentimental significance in the document sentiment vector space further comprises:
creating an action document vector for each document vector from the documents-by-concepts matrix representing a sentimentally significant document.

19. The method of claim 18, wherein assessing the sentimentality of the query string, by the computer, by comparing the representation of the query string for semantic similarity to the region of sentimental significance in the document sentiment vector space further comprises:
selecting an action document vector most semantically similar to the query string for assessing the sentimentality of the query string.

20. The method of claim 12, further comprises:
receiving, by the computer, a sentiment time decay factor for publications, wherein the sentiment time decay factor reflects a limited timeframe of influence of publications on the extrinsic metric relative to the publication dates for the publications;

finding, by the computer, an age sentiment score for the on temporaneous publication by applying the sentiment time decay factor to the sentiment score for age relative to the contemporaneous publication date;

finding, by the computer, a second age sentiment score for a second contemporaneous publication by applying the sentiment time decay factor to the second sentiment score for age relative to the second contemporaneous publication date; and sentiment ranking, by the computer, the contemporaneous publication and the second contemporaneous publication based on their respective age sentiment score and second age sentiment score.

21. The method of claim 20, wherein defining the region of the sentimental significance in the document sentiment vector space further comprises:

creating a singular sentiment vector from a product of document vectors from the documents-by-concepts matrix representing the identified sentimentally significant documents.

22. The method of claim 20, wherein defining the region of the sentimental significance in the document sentiment vector space further comprises:

creating a binding term vector from term vector in the term-by-concepts matrix representing the unique sentiment binding term.

23. The method of claim 20, wherein defining the region of sentimental significance in the document sentiment vector space further comprises:

creating an action document vector for each document vector from the documents-by-concepts matrix representing a sentimentally significant document.

24. The method of claim 23, wherein assessing the sentimentality of the query string, by the computer, by comparing the representation of the query string for semantic similarity to the region of sentimental significance in the document sentiment vector space further comprises:

selecting an action document vector most semantically similar to the query string for assessing the sentimentality of the query string.

25. The method of claim 14, further comprises:

receiving, by the computer, a trusted group sentiment score for the contemporaneous publication, the trusted group sentiment score being indicative of the sentiment of a trusted group of humans toward the particular topic with respect to the contemporaneous publication;

receiving, by the computer, a second trusted group sentiment score for the second contemporaneous publication, the second trusted group sentiment score being indicative of the sentiment of the trusted group of humans toward the particular topic with respect to the second contemporaneous publication;

finding, by the computer, a cumulative sentiment score for the contemporaneous publication from the sentiment score and the trusted group sentiment score; and finding, by the computer, a second cumulative sentiment score for the second contemporaneous publication from the sentiment score and the trusted group sentiment score;

receiving, by the computer, a sentiment time decay factor for publications, wherein the sentiment time decay factor reflects a limited timeframe of influence of the publications on the extrinsic metric relative to the publication dates for the publications;

finding, by the computer, an age sentiment score for the contemporaneous publication by applying the sentiment time decay factor to the cumulative sentiment score for age relative to the contemporaneous publication date;

finding, by the computer, a second age sentiment score for the second contemporaneous publication by applying the sentiment time decay factor to the second cumulative sentiment score for age relative to the second contemporaneous publication date; and sentiment ranking, by the computer, the contemporaneous publication and the second contemporaneous publication based on their respective age sentiment score and second age sentiment score.

26. The method of claim 14, further comprises:

receiving, by the computer, a global community sentiment score for the contemporaneous publication, the global community sentiment score being indicative of the sentiment of a global community of humans toward the particular topic with respect to the contemporaneous publication;

receiving, by the computer, a second global community sentiment score for the second contemporaneous publication, the second global community sentiment score being indicative of the sentiment of the global community of humans toward the particular topic with respect to the second contemporaneous publication;

receiving, by the computer, a trusted group sentiment score for the contemporaneous publication, the trusted group sentiment score being indicative of the sentiment of a trusted group of humans toward the particular topic with respect to the contemporaneous publication;

receiving, by the computer, a second trusted group sentiment score for the second contemporaneous publication, the second trusted group sentiment score being indicative of the sentiment of the trusted group of humans toward the particular topic with respect to the second contemporaneous publication;

finding, by the computer, a cumulative sentiment score for the contemporaneous publication relative to the sentiment score, the trusted group sentiment score and the global community sentiment score; and finding, by the computer, a second cumulative sentiment score for the second contemporaneous publication relative to the second sentiment score, the second trusted group sentiment score, and the second global community sentiment score;

receiving, by the computer, a sentiment time decay factor for publications, wherein the sentiment time decay factor reflects a limited timeframe of influence of the publications on the extrinsic metric relative to the publication dates for the publications;

finding, by the computer, an age sentiment score for the contemporaneous publication by applying the sentiment time decay factor to the cumulative sentiment score for age relative to the contemporaneous publication date;

finding, by the computer, a second age sentiment score for the second contemporaneous publication by applying the sentiment time decay factor to the second cumulative sentiment score for age relative to the second contemporaneous publication date; and sentiment ranking, by the computer, the contemporaneous publication and the second contemporaneous publication based on their respective age sentiment score and second age sentiment score.

27. The method of claim 26, wherein defining the region of sentimental significance in the document sentiment vector space further comprises:

creating a singular sentiment vector from a product of document vectors from the documents-by-concepts matrix representing the identified sentimentally significant documents.

28. The method of claim 26, wherein defining the region of sentimental significance in the document sentiment vector space further comprises:
creating a binding term vector from term vector in the term-by-concepts matrix representing the unique sentiment binding term.

29. The method of claim 27, wherein defining the region of sentimental significance in the document sentiment vector space further comprises:
creating a binding term vector from term vector in the term-by-concepts matrix representing the unique sentiment binding term.

30. The method of claim 29, wherein assessing the sentimentality of the query string, by the computer, by comparing the representation of the query string for semantic similarity to the region of sentimental significance in the document sentiment vector space further comprises:
selecting an action document vector most semantically similar to the query string for assessing the sentimentality of the query string.

31. The method of claim 3, wherein assessing the sentimentality of the query string, by the computer, by comparing the representation of the query string for semantic similarity to the region of sentimental significance in the document sentiment vector space further comprises:
finding a dot product of the representation of the query string and the region of sentimental significance.

32. The method of claim 1, wherein deriving the publication date for each document in the group of documents further comprises finding a explicit publication date associated with each document in the group, inferring the publication date, implying the publication date, and assuming the publication date.

33. A computer implemented method of assessing human sentiment from a group of documents, each document in the group of documents having a plurality of terms and being digitally represented in a computer, the method comprising:
receiving, by the computer, a group of documents, each document in the group of documents comprising a context of a plurality of terms and all documents in the group of documents representative of a particular topic; comprising:
receiving a sentiment term meaning model for defining sentimental meanings of terms; and
sentiment scoring the sentiment of each document in the group of documents based on the sentiment term meaning model and the plurality of terms in the respective document in the group of documents;
constructing, by the computer, a document sentiment vector space from the group of documents, wherein construction of the document sentiment vector space comprises:
assessing sentimentality of each document in the group of documents toward the topic, comprising:
deriving a publication date for each document in the group of documents;
electing an extrinsic metric for the particular topic for assessing the sentimentality toward the topic, the extrinsic metric being related to an affirmative and intentional human action with a value of the extrinsic metric being indicative of the human action;
receiving extrinsic metric historical data for each document in the group of documents proximate to the respective publication date for each document; and
examining the extrinsic metric historical data for each document proximate to the respective publication date for each document over a timeframe of influence for changes in the value of the extrinsic metric, wherein the timeframe of influence is a predetermined time period in which a context of a document influences humans to undertake an affirmative and intentional human action resulting in a change in the value of the extrinsic metric;
identifying, by the computer, sentimentally significant documents in the group of documents with heightened sentimentality toward the particular topic, wherein sentimentality represents human emotion toward the topic, comprising:
receiving an action sentiment score indicative of sentimental significance;
comparing the sentiment score of each document in the group of documents to the action sentiment score;
receiving a sentiment value for the change in the extrinsic metric historical data, the sentiment value being indicative of sentimental significance; and
comparing the sentiment value to the changes in the value of the extrinsic metric over the timeframe of influence for each document in the group;
labeling, by the computer, the identified sentimentally significant documents by including a unique sentiment binding term in the context of the plurality of terms;
representing, by the computer, each document in the group of documents in the document sentiment vector space;
defining, by the computer, a region of sentimental significance in the document sentiment vector space based on an occurrence of document representations for the identified sentimentally significant documents with the unique sentiment binding term;
receiving, by the computer, a query string; and
assessing, by the computer, the sentimentality of the query string by comparing a representation of the query string for semantic similarity to the region of sentimental significance in the document sentiment vector space.

* * * * *